United States Patent
Ouchi et al.

(10) Patent No.: US 12,508,722 B2
(45) Date of Patent: Dec. 30, 2025

(54) HOLDING DEVICE, CONTROL METHOD, CONTROL DEVICE, AND ROBOT SYSTEM

(71) Applicant: Kawasaki Jukogyo Kabushiki Kaisha, Kobe (JP)

(72) Inventors: Satoshi Ouchi, Kobe (JP); Yuna Takahashi, Kobe (JP); Kazunori Hirata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 884 days.

(21) Appl. No.: 17/780,665

(22) PCT Filed: Nov. 27, 2020

(86) PCT No.: PCT/JP2020/044327
§ 371 (c)(1),
(2) Date: May 27, 2022

(87) PCT Pub. No.: WO2021/107129
PCT Pub. Date: Jun. 3, 2021

(65) Prior Publication Data
US 2023/0356410 A1    Nov. 9, 2023

(30) Foreign Application Priority Data

Nov. 29, 2019    (JP) ................................ 2019-216154

(51) Int. Cl.
| | |
|---|---|
| B25J 15/06 | (2006.01) |
| B25J 9/04 | (2006.01) |
| B25J 9/16 | (2006.01) |
| B25J 15/00 | (2006.01) |

(52) U.S. Cl.
CPC ........... B25J 15/0616 (2013.01); B25J 9/043 (2013.01); B25J 9/1615 (2013.01); B25J 9/1669 (2013.01); B25J 9/1682 (2013.01); B25J 15/0066 (2013.01)

(58) Field of Classification Search
CPC ...... B25J 15/0616; B25J 9/043; B25J 9/1615; B25J 9/1669; B25J 9/1682; B25J 15/0066
See application file for complete search history.

(56) References Cited

U.S. PATENT DOCUMENTS

| | | | | |
|---|---|---|---|---|
| 6,193,142 B1* | 2/2001 | Segawa | .................... | B25J 9/009 |
| | | | | 219/127 |
| 6,652,014 B2* | 11/2003 | Schmalz | .............. | B25J 15/0616 |
| | | | | 414/737 |
| 6,860,531 B2* | 3/2005 | Sherwin | ............... | B25J 15/0616 |
| | | | | 294/185 |

(Continued)

FOREIGN PATENT DOCUMENTS

| | | |
|---|---|---|
| CN | 108687791 A | 10/2018 |
| CN | 108927822 A | 12/2018 |

(Continued)

*Primary Examiner* — Monica E Millner
(74) *Attorney, Agent, or Firm* — XSENSUS LLP

(57) ABSTRACT

A holding device includes: a first suction structure that sucks a main member; and a first grasping structure that is arranged adjacent to the first suction structure in a direction intersecting with a first direction and grasps a first auxiliary member. The first suction structure is directed so as to suck the main member located in the first direction, and the first grasping structure is directed so as to grasp the first auxiliary member located in the first direction.

20 Claims, 15 Drawing Sheets

(56) References Cited

U.S. PATENT DOCUMENTS

| | | | | |
|---|---|---|---|---|
| 7,044,706 | B2* | 5/2006 | Jung | B65G 47/90 414/737 |
| 8,478,443 | B2* | 7/2013 | Hashimoto | B25J 19/06 700/250 |
| 9,352,463 | B2* | 5/2016 | Tomo | B25J 15/0616 |
| 9,498,887 | B1* | 11/2016 | Zevenbergen | B25J 15/0052 |
| 2003/0075051 | A1* | 4/2003 | Watanabe | B65B 5/12 99/468 |
| 2008/0163403 | A1* | 7/2008 | Tominaga | B25J 15/0052 414/744.1 |
| 2010/0078953 | A1* | 4/2010 | Ban | B25J 15/0266 294/183 |
| 2011/0048650 | A1* | 3/2011 | Lawson | B25J 15/0028 157/16 |
| 2011/0268548 | A1* | 11/2011 | Doll | B25J 15/00 414/688 |
| 2014/0179501 | A1* | 6/2014 | Akama | B31B 50/262 493/162 |
| 2015/0105004 | A1* | 4/2015 | Zhou | B25J 15/0057 451/280 |
| 2016/0039550 | A1* | 2/2016 | Boudreau | B25J 9/0051 53/446 |
| 2016/0176654 | A1* | 6/2016 | Gazzola | B65D 85/542 414/800 |
| 2016/0325438 | A1* | 11/2016 | Li | B25J 15/0616 |
| 2017/0066544 | A1* | 3/2017 | Van Der Laan | B65B 35/16 |
| 2017/0326735 | A1* | 11/2017 | Yoon | B25J 15/0616 |
| 2018/0215035 | A1* | 8/2018 | Ono | B25J 9/044 |
| 2018/0297200 | A1 | 10/2018 | Nakayama | |
| 2018/0370043 | A1* | 12/2018 | Hashimoto | B25J 15/0019 |
| 2019/0159372 | A1* | 5/2019 | Hashimoto | H05K 13/0408 |
| 2019/0161289 | A1 | 5/2019 | Hashimoto et al. | |
| 2020/0262057 | A1* | 8/2020 | Saez | B25J 9/0084 |
| 2020/0368862 | A1 | 11/2020 | Hirata et al. | |
| 2022/0193929 | A1 | 6/2022 | Azuma et al. | |
| 2022/0292702 | A1* | 9/2022 | Yoshikuwa | G06V 10/752 |

FOREIGN PATENT DOCUMENTS

| | | |
|---|---|---|
| CN | 209289302 U | 8/2019 |
| JP | 2003-159687 A | 6/2003 |
| JP | 2004-306213 A | 11/2004 |
| JP | 2017-39172 A | 2/2017 |
| JP | 2017-218268 A | 12/2017 |
| JP | 2019-136834 A | 8/2019 |
| JP | 2019-188600 A | 10/2019 |
| JP | 2020-168700 A | 10/2020 |
| KR | 10-2019-0091506 A | 8/2019 |
| WO | 2015/033465 A1 | 3/2015 |

* cited by examiner ated example.
HOLDING DEVICE, CONTROL METHOD, CONTROL DEVICE, AND ROBOT SYSTEM

CROSS-REFERENCE TO RELATED APPLICATIONS

This application is based on PCT filing PCT/JP2020/044327, filed on Nov. 27, 2020, and claims priority to and the benefit of Japanese Patent Application No. 2019-216154 filed on Nov. 29, 2019, the entire disclosure of each of which is incorporated herein by reference.

TECHNICAL FIELD

The present disclosure relates to a holding device, a control method, a control device, and a robot system.

BACKGROUND ART

Robots have been used to perform work instead of humans. For example, PTL 1 discloses a robot that packs foods in trays. The robot of PTL 1 includes: a supplying portion and a grasping portion at a right hand portion of a right arm; and another supplying portion and another grasping portion at a left hand portion of a left arm. The supplying portion includes a suction head whose direction can be changed to a lower side or a lateral side. The grasping portion includes a plate-shaped grasping member. The robot transfers the foods, sucked by the suction heads, from a conveyor belt to a temporary placing base by the arms and arranges the foods with the directions thereof aligned. Moreover, the robot sandwiches all the arranged foods from lateral sides and transfers the foods to the tray by the grasping members of the left and right arms.

CITATION LIST

Patent Literature

PTL 1: Japanese Laid-Open Patent Application Publication No. 2017-218268

SUMMARY OF INVENTION

In PTL 1, the supplying portion and the grasping portion perform works of different purposes with respect to the foods. Moreover, each of the grasping portions of the left and right hands cannot hold the foods by itself. However, in some cases, the robot is required to perform a work in which holding of a target object by suction and an action with grasping with respect to the target object are associated with each other.

An object of the present disclosure is to provide a holding device, a control method, a control device, and a robot system, each of which can perform holding of a target object by suction and the application of an action with grasping with respect to the target object.

To achieve the above object, a holding device according to one aspect of the present disclosure includes: a first suction structure that sucks a main member; and a first grasping structure that is arranged adjacent to the first suction structure in a direction intersecting with a first direction and grasps a first auxiliary member. The first suction structure is directed so as to suck the main member located in the first direction. The first grasping structure is directed so as to grasp the first auxiliary member located in the first direction.

According to the technique of the present disclosure, the target object can be held at two positions, and the action can be applied to the target object.

DESCRIPTION OF EMBODIMENTS

Figure 1:
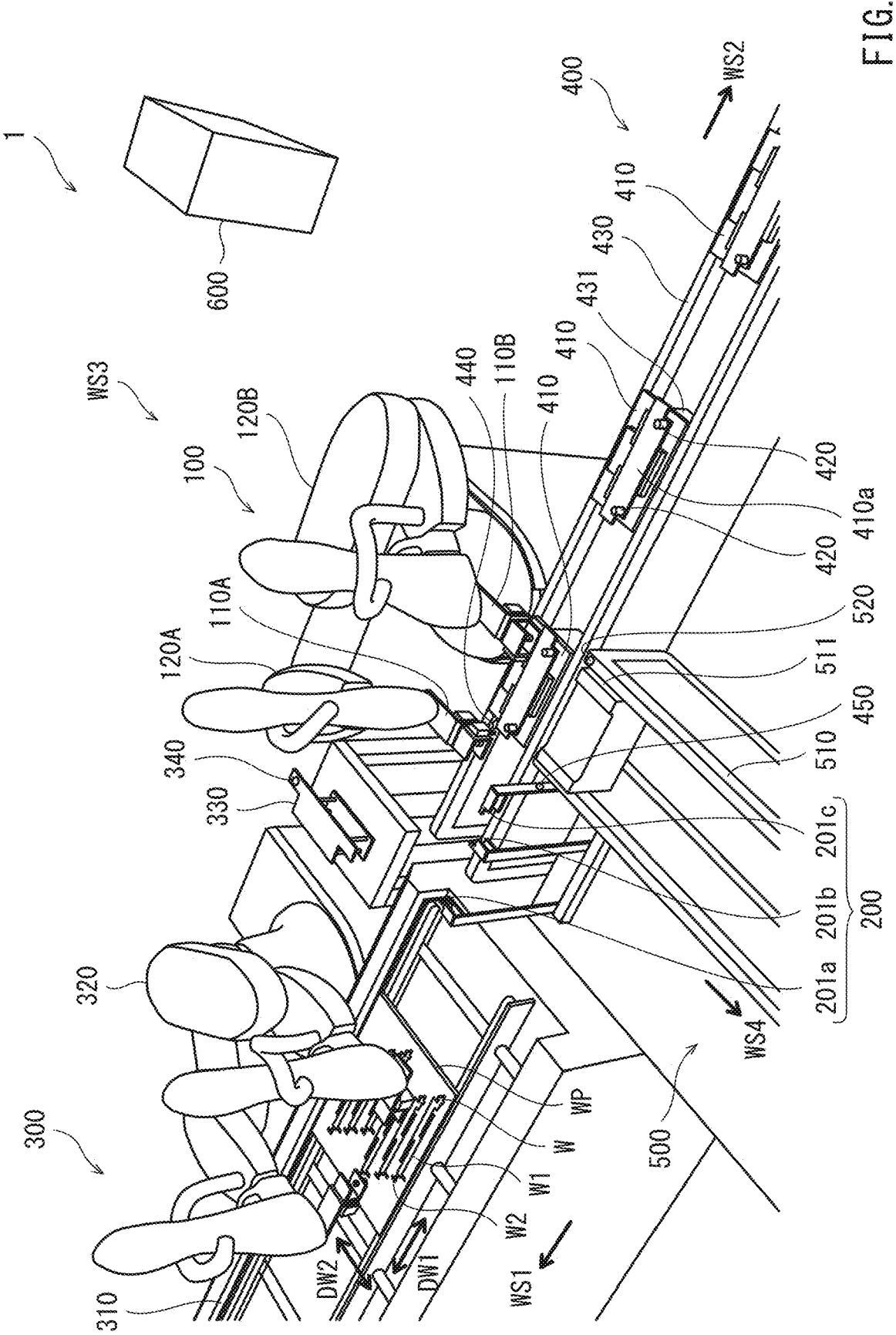
FIG. 1 is a perspective view showing one example of a robot system according to an embodiment.

First, examples of aspects of the present disclosure will be described. A holding device according to one aspect of the present disclosure includes: a first suction structure that sucks a main member; and a first grasping structure that is arranged adjacent to the first suction structure in a direction intersecting with a first direction and grasps a first auxiliary member. The first suction structure is directed so as to suck the main member located in the first direction. The first grasping structure is directed so as to grasp the first auxiliary member located in the first direction.

According to the above aspect, the holding device can hold, by suction and grasping, the main member and the first auxiliary member located in the same direction. For example, the holding device can hold the main member and the first auxiliary member at the same time. Moreover, since the first suction structure and the first grasping structure are adjacent to each other, and the held main member and the held first auxiliary member are located in the same direction, the holding device can apply an action to the main member by using the first auxiliary member. For example, the holding device can arrange the main member by canceling the suction, and then, place the first auxiliary member on the main member by canceling the grasping. Therefore, the holding device can perform the holding by suction and the application of the action with grasping with respect to the main member that is the target object.

In the holding device according to the aspect of the present disclosure, the first suction structure and the first grasping structure may be arranged at a first robot arm. According to the above aspect, the first suction structure and the first grasping structure can be freely moved by the first robot arm.

The holding device according to the aspect of the present disclosure may further include: a first support that supports the first suction structure and the first grasping structure; a first base coupled to the first support such that the first support is turnable; and a first turning device that turns the first support. According to the above aspect, the first suction structure and the first grasping structure can be turned. For example, the first suction structure and the first grasping structure can be turned when the robot arm at which the first suction structure and the first grasping structure are arranged is in a stationary state.

The holding device according to the aspect of the present disclosure may further include: a second suction structure that sucks the main member, and a second grasping structure that is arranged adjacent to the second suction structure in a direction intersecting with the first direction and grasps a second auxiliary member. The second suction structure may be directed so as to suck the main member located in the first direction. The second grasping structure may be directed so as to grasp the second auxiliary member located in the first direction. According to the above aspect, the holding device can hold the main member by two suction structures at two holding positions. Moreover, the holding device can perform actions with respect to the main member by using the auxiliary members at positions adjacent to the holding positions. Therefore, secure holding of the main member and the application of the actions to the main member at the holding positions can be realized.

In the holding device according to the aspect of the present disclosure, the second suction structure and the second grasping structure may be arranged at a second robot arm. According to the above aspect, the second suction structure and the second grasping structure can be freely moved by the second robot arm independently from the first suction structure and the first grasping structure.

In the holding device according to the aspect of the present disclosure, the first suction structure, the first grasping structure, the second suction structure, and the second grasping structure may be arranged at one robot arm. According to the above aspect, the holding of the main member at two holding positions and the application of the actions to the main member at the holding positions can be realized by using only one robot arm.

The holding device according to the aspect of the present disclosure may further include: a second support that supports the second suction structure and the second grasping structure; a second base coupled to the second support such that the second support is turnable; and a second turning device that turns the second support. According to the above aspect, the second suction structure and the second grasping structure can be turned. For example, the second suction structure and the second grasping structure can be turned when the robot arm at which the second suction structure and the second grasping structure are arranged is in a stationary state.

The holding device according to the aspect of the present disclosure may further include a moving device that moves the grasping structure in the first direction. According to the above aspect, the holding device can move the auxiliary member in the first direction and cancel the grasping of the auxiliary member. Therefore, w % ben canceling the grasping, the holding device can surely place the auxiliary member without dropping the auxiliary member.

In the holding device according to the aspect of the present disclosure, the suction structure may include a portion that is extensible and contractable. According to the above aspect, the holding device can press the suction structure against a placement surface located in the first direction to contract the suction structure, and with this, the holding device can move the auxiliary member, grasped by the grasping structure, close to the placement surface. When canceling the grasping, the holding device can surely place the auxiliary member without dropping the auxiliary member.

In the holding device according to the aspect of the present disclosure, the main member may be a plate-shaped member, and the auxiliary member may be a weight that presses the main member. According to the above aspect, the holding device can place the main member by canceling the suction, and then, can place the auxiliary member on the main member by canceling the grasping. Therefore, the placed main member is fixed by the auxiliary member so as not to move.

A control method according to one aspect of the present disclosure is a control method of conveying a main member by using a first robot arm and a second robot arm, the first robot arm including a first suction structure and a first grasping structure which are adjacent to each other in a direction intersecting with a first direction, the second robot arm including a second suction structure and a second grasping structure which are adjacent to each other in a direction intersecting with the first direction. The control method includes: operating the first robot arm and the second robot arm to make the first grasping structure grasp a first auxiliary member located in the first direction and make the second grasping structure grasp a second auxiliary member located in the first direction; with the first grasping structure and the second grasping structure respectively grasping the first auxiliary member and the second auxiliary member, operating the first robot arm and the second robot arm to make the first suction structure and the second suction structure suck and hold the main member located in the first direction; operating the first robot arm and the second robot arm to move the sucked main member and place the main member on an arrangement surface of a conveyance destination; and making the first grasping structure and the second grasping structure cancel the grasping and place the first auxiliary member and the second auxiliary member on the main member.

According to the above aspect, the first and second robot arms can hold the main member by using the first and second suction structures and transfer the main member to the conveyance destination while holding the first and second auxiliary members by using the first and second grasping structures. Moreover, the first and second robot arms can place the main member on the arrangement surface of the conveyance destination by canceling the suction and place the first and second auxiliary members on the main member by canceling the grasping. Therefore, the holding of the main member by the suction, the conveyance of the main member, and the application of the action with the grasping with respect to the main member can be performed by using two robot arms.

The control method according to the aspect of the present disclosure may further include: operating the first robot arm and the second robot arm to make a position detector, which detects a position of the main member, detect the sucked main member; and based on a detection result of the position detector, operating the first robot arm and the second robot arm to adjust an interval between the first suction structure and the second suction structure on the arrangement surface. According to the above aspect, the position of the main member relative to the first and second suction structures can be detected. With this, the positioning accuracy of the main member relative to the conveyance destination by using the first and second robot arms can be improved.

In the control method according to the aspect of the present disclosure, the first suction structure and the first grasping structure may be attached to the first robot arm through a first support and a first base. The first support may support the first suction structure and the first grasping structure. The first base may be attached to the first robot arm and be coupled to the first support such that the first support is turnable. The first support may be turned by a first turning device. The second suction structure and the second grasping structure may be attached to the second robot arm through a second support and a second base. The second support may support the second suction structure and the second grasping structure. The second base may be attached to the second robot arm and be coupled to the second support such that the second support is tunable. The second support may be turned by a second turning device. According to the above aspect, the first suction structure and the first grasping structure can turn relative to the first robot arm, and the second suction structure and the second grasping structure can turn relative to the second robot arm. Therefore, the postures of the first suction structure, the first grasping structure, the second suction structure, and the second grasping structure can be variously changed.

The control method according to the aspect of the present disclosure may further include making a first moving device, which moves the first grasping structure in the first direction, and a second moving device, which moves the second grasping structure in the first direction, move the first grasping structure and the second grasping structure in the first direction to place on the main member the first auxiliary member grasped by the first grasping structure and the second auxiliary member grasped by the second grasping structure. According to the above aspect, when canceling the grasping, the auxiliary members can be surely placed on the main member without being dropped.

The control method according to the aspect of the present disclosure may further include operating the first robot arm and the second robot arm such that the first suction structure including a portion that is extensible and contractable and the second suction structure including a portion that is extensible and contractable are pressed against the main member to be contracted, and with this, the first auxiliary member grasped by the first grasping structure and the second auxiliary member grasped by the second grasping structure are placed on the main member. According to the above aspect, when canceling the grasping, the auxiliary members can be surely placed on the main member without being dropped.

A control device according to one aspect of the present disclosure is a control device that executes the control method according to the aspect of the present disclosure. According to the above aspect, the same effects as the control method according to the aspect of the present disclosure are obtained.

A robot system according to one aspect of the present disclosure includes: a first robot arm; a second robot arm; a first suction structure and a first grasping structure that are arranged adjacent to each other in a direction intersecting with a first direction at the first robot arm; a second suction structure and a second grasping structure that are arranged adjacent to each other in a direction intersecting with the first direction at the second robot arm; and a control device that controls operations of the first robot arm, the second robot arm, the first grasping structure, and the second grasping structure. The first suction structure, the first grasping structure, the second suction structure, and the second grasping structure are directed so as to suck or grasp a main member and auxiliary members located in the first direction. The control device operates the first robot arm and the second robot arm to make the first grasping structure grasp a first auxiliary member located in the first direction and make the second grasping structure grasp a second auxiliary member located in the first direction. With the first auxiliary member and the second auxiliary member grasped, the control device operates the first robot arm and the second robot arm to make the first suction structure and the second suction structure suck and hold the main member located in the first direction. The control device operates the first robot arm and the second robot arm to move the sucked main member and place the main member on an arrangement surface of a conveyance destination. The control device makes the first grasping structure and the second grasping structure cancel the grasping and place the first auxiliary member and the second auxiliary member on the main member. According to the above aspect, the same effects as the holding device according to the aspect of the present disclosure are obtained.

The robot system according to one aspect of the present disclosure includes: a robot arm; a first suction structure and a first grasping structure that are arranged adjacent to each other in a direction intersecting with a first direction at the robot arm, a second suction structure and a second grasping structure that are arranged adjacent to each other in a direction intersecting with the first direction at the robot arm; and a control device that controls operations of the robot arm, the first grasping structure, and the second grasping structure. The first suction structure, the first grasping structure, the second suction structure, and the second grasping structure are directed so as to suck or grasp a main member and auxiliary members located in the first direction. The control device operates the robot arm to make the first grasping structure grasp a first auxiliary member located in the first direction and make the second grasping structure grasp a second auxiliary member located in the first direction. With the first auxiliary member and the second auxiliary member grasped, the control device operates the robot arm to make the first suction structure and the second suction structure suck and hold the main member located in the first direction. The control device operates the robot arm to move the sucked main member and place the main member on an arrangement surface of a conveyance destination. The control device makes the first grasping structure and the second grasping structure cancel the grasping and place the first auxiliary member and the second auxiliary member on the main member. According to the above aspect, the same effects as the holding device according to the aspect of the present disclosure are obtained.

The robot system according to the aspect of the present disclosure may further include a position detector that detects a position of the main member and outputs a detection result to the control device. Based on the detection result of the position detector, the control device may detect a relative position of the main member relative to the first suction structure and the second suction structure. Based on the relative position, the control device may operate the robot arm to adjust positions of the first suction structure and the second suction structure on the arrangement surface. According to the above aspect, the position of the main member relative to the first and second suction structures can be detected. With this, the positioning accuracy of the main member relative to the conveyance destination by using the robot arm can be improved.

In the robot system according to the aspect of the present disclosure, the first suction structure and the first grasping structure may be attached to the robot arm through a first support and a first base. The first support may support the first suction structure and the first grasping structure. The first base may be attached to the robot arm and be coupled to the first support such that the first support is turnable. The first support may be turned by a first turning device. The second suction structure and the second grasping structure may be attached to the robot arm through a second support and a second base. The second support may support the second suction structure and the second grasping structure. The second base may be attached to the robot arm and be coupled to the second support such that the second support is turnable. The second support may be turned by a second turning device. According to the above aspect, the first suction structure, the first grasping structure, the second suction structure, and the second grasping structure can turn relative to the robot arm. Therefore, the postures of the first suction structure, the first grasping structure, the second suction structure, and the second grasping structure can be variously changed.

The robot system according to the aspect of the present disclosure may further include: a first moving device that is located at the robot arm and moves the first grasping structure in the first direction; and a second moving device that is located at the robot arm and moves the second grasping structure in the first direction. The control device may make the first moving device and the second moving device move the first grasping structure and the second grasping structure in the first direction to place on the main member the first auxiliary member grasped by the first grasping structure and the second auxiliary member grasped by the second grasping structure. According to the above aspect, when canceling the grasping, the auxiliary members can be surely placed on the main member without being dropped.

In the robot system according to the aspect of the present disclosure, the suction structure may include a portion that is extensible and contractable. The control device may operate the robot arm such that the suction structure is pressed against the main member to be contracted, and with this, the first auxiliary member grasped by the first grasping structure and the second auxiliary member grasped by the second grasping structure are placed on the main member. According to the above aspect, when canceling the grasping, the auxiliary members can be surely placed on the main member without being dropped.

The robot system according to the aspect of the present disclosure may further include an arrangement base including the arrangement surface and made of a material having magnetism. The main member may be a plate-shaped member, and the auxiliary members may be magnets that press the main member. According to the above aspect, the robot system can place the main member on the arrangement base by canceling the suction, and then, place the auxiliary members on the main member by canceling the grasping. Therefore, the placed main member is surely fixed by the weight and magnetic force of the auxiliary members so as not to move.

EMBODIMENT

Hereinafter, embodiments of the present disclosure will be described with reference to the drawings. The embodiments described below are comprehensive or specific examples. Among components in the following embodiments, components that are not recited in independent claims which embody the broadest concept of the present disclosure will be described as optional components. The diagrams in the attached drawings are schematic diagrams and are not necessarily strictly drawn. In the diagrams, the same reference signs are used for the substantially identical components, and the repetition of the same explanation may be avoided, or such explanation may be simplified. Moreover, in the present description and the claims, a "device" may denote not only a single device but also a system including devices.

Configuration of Robot System

The configuration of a robot system 1 according to the embodiment will be described. FIG. 1 is a perspective view showing one example of the robot system 1 according to the embodiment. As shown in FIG. 1, the robot system 1 according to the embodiment includes a robot 100, a position detector 200, conveying devices 300, 400, and 500, and a control device 600. In the present embodiment, the following will describe a case where the robot 100 is arranged at a third workspace WS3 and performs one of steps of producing a substrate (also called a FPC (flexible printed substrate)) formed such that an electric circuit is formed on a workpiece W that is one example of a plate-shaped member having flexibility. In this step, the robot system 1 makes the robot 100 place a workpiece W, conveyed from a first workspace WS1 where another work step is performed, on an arrangement base 410 conveyed from a second workspace WS2 where yet another work step is performed, and transfer the arrangement base 410 to a fourth workspace WS4 where a pressure-joining step for the workpiece W is performed. A pressure-joining device (not shown) is arranged at the fourth workspace WS4. Each of the number of robots 100, the number of position detectors 200, the number of conveying devices 300, the number of conveying devices 400, and the number of conveying devices 500 in the robot system 1 is not limited to one as shown in FIG. 1 and may be any number.

For example, the workpiece W of the FPC has such a configuration that a conductor having electrical conductivity is attached onto an insulation base film through an adhesive layer. The base film is made of plastic, such as polyimide or polyester. The adhesive layer is made of an adhesive such as an epoxy resin adhesive or an acrylic resin adhesive, a prepreg, or the like. The conductor is made of copper foil, silver foil, or the like. A target object handled by the robot system 1 is not limited to the workpiece W of the FPC and may be any member. The robot system 1 may arrange the target object at a predetermined position. The workpiece W is one example of a main member.

The control device 600 controls the entire robot system 1. Specifically, the control device 600 controls the robot 100, the position detector 200, and the conveying devices 300 to 500 such that the operations thereof are associated with each other. For example, the control device 600 includes a computer.

Figure 2:
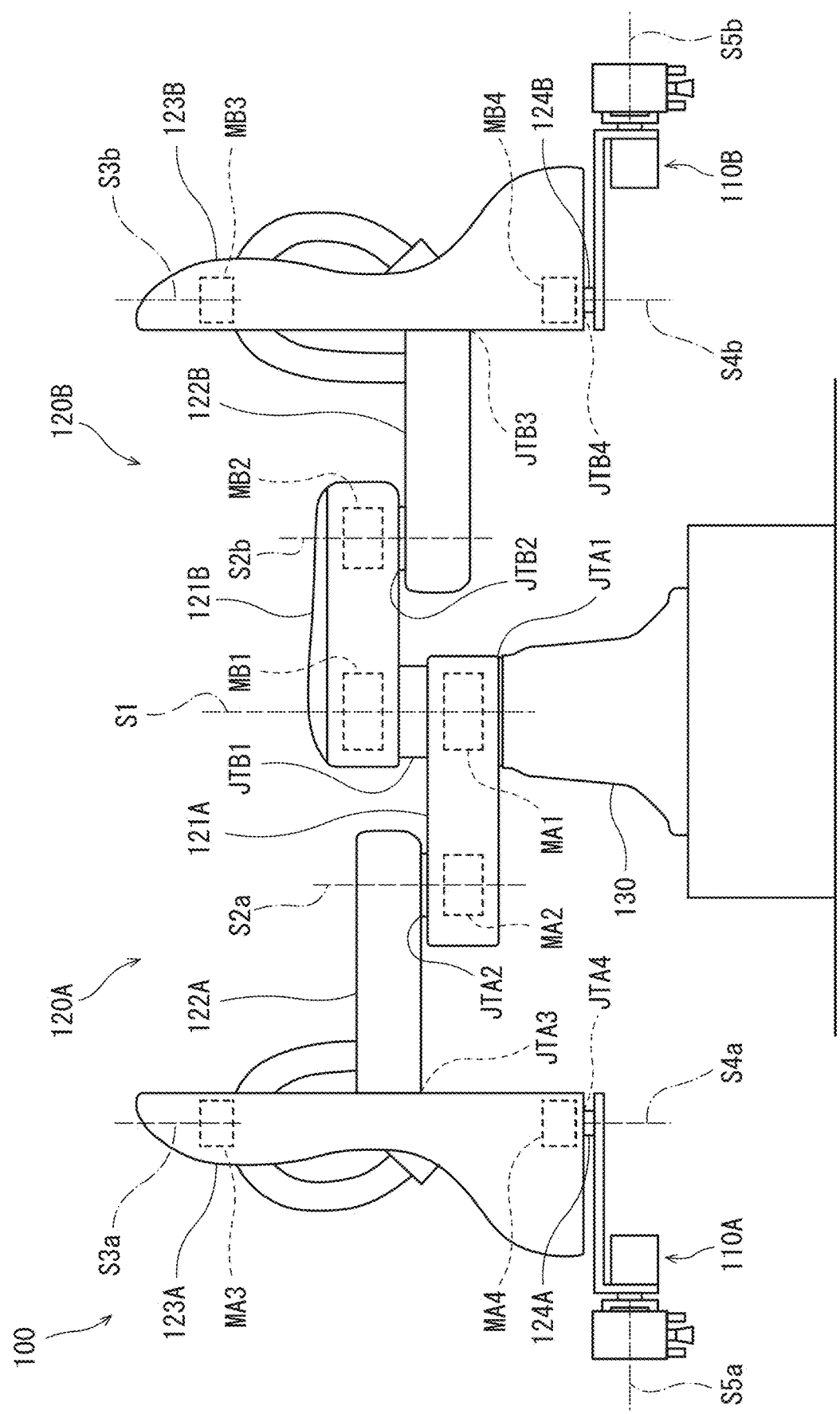
FIG. 2 is a side view showing one example of the configuration of a robot according to the embodiment.

FIG. 2 is a side view showing one example of the configuration of the robot 100 according to the embodiment. As shown in FIG. 2, in the present embodiment, the robot 100 is an industrial robot but is not limited to this. The robot 100 includes end effectors 110A and 110B, robot arms 120A and 120B, and a base 130. The end effectors 110A and 110B can apply actions to the workpiece W. The robot arms 120A and 120B can move the end effectors 110A and 110B such that the end effectors 110A and 110B execute the actions. The robot arms 120A and 120B are supported by the base 130 so as to be turnable. The robot 100 may include a device that moves the base 130. The end effectors 110A and 110B are one example of a holding device.

The robot arms 120A and 120B are not especially limited as long as the robot arms 120A and 120B can move the end effectors 110A and 110B located at respective tips thereof. In the present embodiment, the robot arms 120A and 120B are horizontal articulated arms. The robot arms 120A and 120B may be vertical articulated robot arms, polar coordinate robot arms, cylindrical coordinate robot arms, rectangular coordinate robot arms, or other robot arms. The robot arms 120A and 120B are coaxially turnable in a horizontal plane about a first axis S1 extending in a vertical direction. The first robot arm 120A is arranged at a lower side of the second robot arm 120B in a direction along the first axis S1. Therefore, the robot 100 is a coaxial double-arm robot.

The first robot arm 120A includes links 121A to 124A, joints JTA1 to JTA4, and arm driving devices MA1 to MA4. The second robot arm 120B includes links 121B to 124B, joints JTB1 to JTB4, and arm driving devices MB1 to MB4. Each of the arm driving devices MA1 to MA4 and MB1 to MB4 includes, for example, an electric motor that uses electric power as a power source. In the present embodiment, each of the arm driving devices MA1 to MA4 and MB1 to MB4 includes a servomotor. The arm driving devices MA1 to MA4 and MB1 to MB4 respectively drive the joints JTA1 to JTA4 and JTB1 to JTB4 by control of the control device 600. Therefore, the robot arms 120A and 120B operate independently. Each of the number of joints of the robot arm 120A and the number of joints of the robot arm 120B is not limited to four and may be five or more or three or less.

The link 121A is connected to the base 130 through the rotary joint JTA1 so as to be turnable about the first axis S1 in a horizontal plane, and the link 121B is connected to the base 130 through the rotary joint JTB1 so as to be turnable about the first axis S1 in a horizontal plane. The link 122A is connected to a tip of the link 121A through the rotary joint JTA2 so as to be turnable in a horizontal plane about a second axis S2$a$ extending in the vertical direction, and the link 122B is connected to a tip of the link 121B through the rotary joint JTB2 so as to be turnable in a horizontal plane about a second axis S2$b$ extending in the vertical direction. The link 123A is connected to a tip of the link 122A through the linear-motion joint JTA3 so as to be able to move up and down along a third axis S3$a$ extending in the vertical direction, and the link 123B is connected to a tip of the link 122B through the linear-motion joint JTB3 so as to be able to move up and down along a third axis S3$b$ extending in the vertical direction. The link 124A is connected to a lower end of the link 123A through the rotary joint JTA4 so as to be turnable about a fourth axis S4$a$ extending in a longitudinal direction of the link 123A, and the link 124B is connected to a lower end of the link 123B through the rotary joint JTB4 so as to be turnable about a fourth axis S4$b$ extending in a longitudinal direction of the link 123B. The fourth axes S4$a$ and S4$b$ are axes extending in the vertical direction. The link 124A includes a mechanical interface to be connected to the end effector 110A, and the link 124B includes a mechanical interface to be connected to the end effector 110B.

Herein, a "horizontal direction" denotes a horizontal direction when the robot 100 is arranged on a horizontal surface, such as a horizontal floor surface, and is also a direction parallel to the above surface. The "vertical direction" denotes a vertical direction in the same case as above and is also a direction perpendicular to the above surface. An "upper side" or "upward" denotes a direction from a lower side toward an upper side in the same case as above, and a "lower side" or "downward" denotes a direction from the upper side toward the lower side in the same case as above. A "lateral side" or "lateral" denotes a direction along the above surface in the same case as above.

Figure 3:
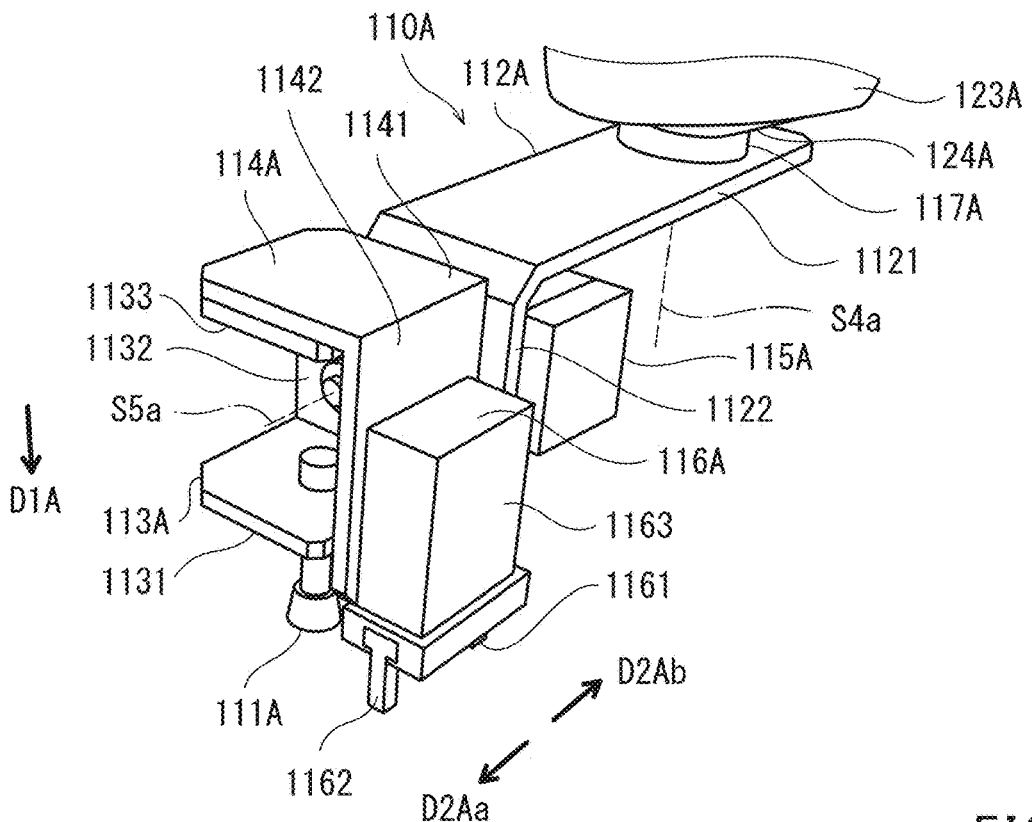
FIG. 3 is a perspective view showing one example of the configuration of a first end effector according to the embodiment.
Figure 4:
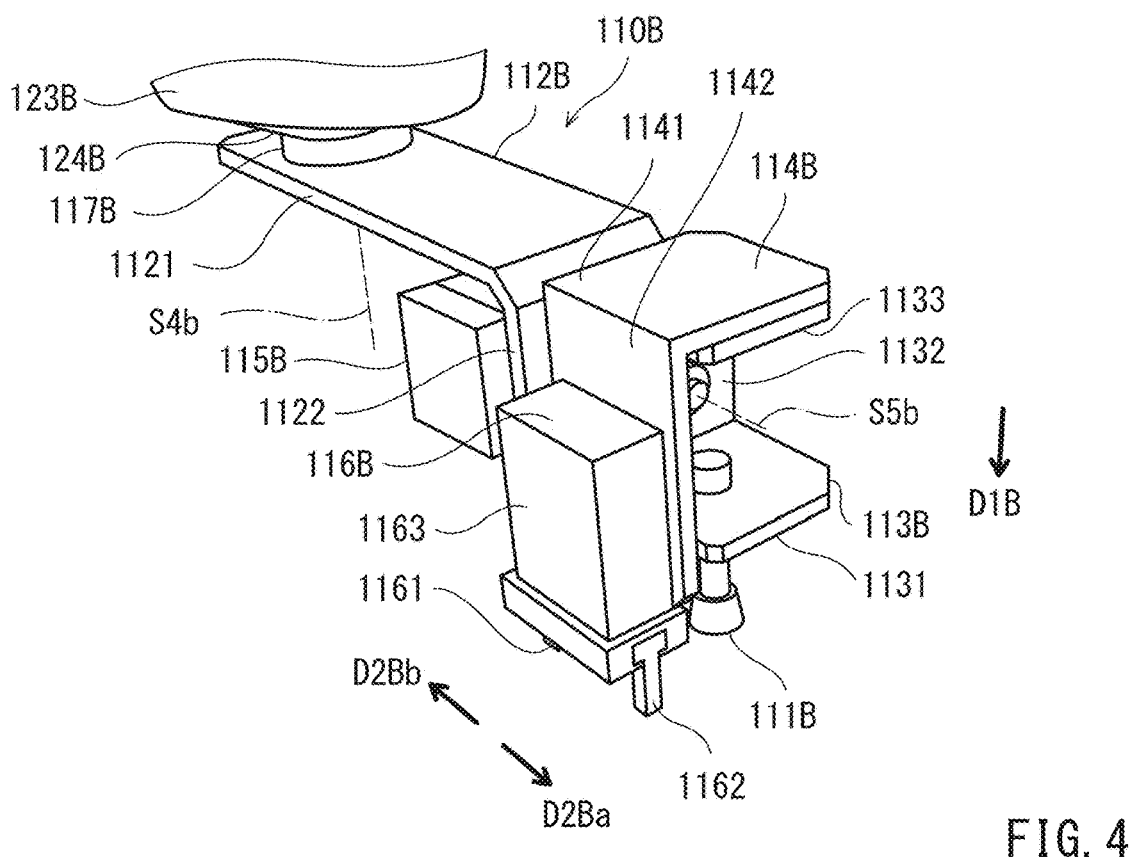
FIG. 4 is a perspective view showing one example of the configuration of a second end effector according to the embodiment.

FIG. 3 is a perspective view showing one example of the configuration of the first end effector 110A according to the embodiment. FIG. 4 is a perspective view showing one example of the configuration of the second end effector 110B according to the embodiment. As shown in FIG. 3, the end effector 110A includes a suction structure 111A, a base 112A, a turning support 113A, a grasping support 114A, a turning device 115A, a grasping structure 116A, and a force sensor 117A. As shown in FIG. 4, the end effector 110B includes a suction structure 111B, a base 112B, a turning support 113B, a grasping support 114B, a turning device 115B, a grasping structure 116B, and a force sensor 117B. In the present embodiment, the end effectors 110A and 110B are the same as each other except for the positions of the grasping structures 116A and 116B.

Each of the suction structures 111A and 111B is not especially limited but has, for example, a hollow nozzle shape and is connected to a negative pressure generator 700 (see FIG. 5) through piping. An open end of the suction structure 111A sucks the target object, such as the workpiece W, by negative pressure generated inside the suction structure 111A by the negative pressure generator 700, and an open end of the suction structure 111B sucks the target object, such as the workpiece W, by negative pressure generated inside the suction structure 111B by the negative pressure generator 700. In the present embodiment, the open end and its vicinity of each of the suction structures 111A and 111B are made of a material having flexibility or elasticity and/or have a hollow bellows shape, and are extensible and contractable. However, the present embodiment is not limited to this. For example, the open ends of the suction structures 111A and 111B and their vicinities may include members, such as springs, having elasticity. For example, the open end of the suction structure 111A and its vicinity are extensible and contractable in a direction in which the suction structure 111A extends, and the open end of the suction structure 111B and its vicinity are extensible and contractable in a direction in which the suction structure 111B extends. The suction structures 111A and 111B that are extensible and contractable improve airtightness with respect to the workpiece W and realize secure suction.

Moreover, even when the suction structures 111A and 111B are pressed against the workpiece W, damages of the workpiece W can be suppressed.

The configuration of the negative pressure generator 700 is not especially limited and may be any existing configuration as long as the negative pressure can be generated inside the suction structures 111A and 111B. For example, the negative pressure generator 700 may have the configuration of a vacuum pump or a pneumatic cylinder which sucks air to generate negative pressure or vacuum or may have the configuration of an ejector which is supplied with compressed air to generate negative pressure or vacuum. Driving of the negative pressure generator 700 is controlled by the control device 600.

Each of the bases 112A and 112B includes a plate-shaped member having an L-shaped section. Each of the bases 112A and 112B includes a longer portion 1121 and a shorter portion 1122 which are substantially perpendicular to each other. The longer portion 1121 of the base 112A is detachably connected to the mechanical interface of the link 124A through the force sensor 117A, and the longer portion 1121 of the base 112B is detachably connected to the mechanical interface of the link 124B through the force sensor 117B. The force sensor 117A is sandwiched by the base 112A and the link 124A, and the force sensor 117B is sandwiched by the base 112B and the link 124B. The shorter portion 1122 of the base 112A is coupled to the turning support 113A so as to be turnable about a fifth axis S5$a$, and the shorter portion 1122 of the base 112B is coupled to the turning support 113B so as to be turnable about a fifth axis S5$b$. A direction along the fifth axis S5$a$ is substantially perpendicular to the shorter portion 1122 of the base 112A, and a direction along the fifth axis S5$b$ is substantially perpendicular to the shorter portion 1122 of the base 112B. The direction along the fifth axis S5$a$ is orthogonal to a direction along the fourth axis S4$a$ but may be a direction intersecting with the direction along the fourth axis S4$a$. The direction along the fifth axis S5$b$ is orthogonal to a direction along the fourth axis S4$b$ but may be a direction intersecting with the direction along the fourth axis S4$b$. The shorter portion 1122 of the base 112A is located away from the fourth axis S4$a$, and the shorter portion 1122 of the base 112B is located away from the fourth axis S4$b$.

Each of the turning supports 113A and 113B includes: two opposing portions 1131 and 1133 that are opposed to each other; and an intermediate portion 1132 connecting the opposing portions 1131 and 1133. For example, each of the turning supports 113A and 113B includes a plate-shaped member having a U-shaped section. The suction structure 111A is attached to the opposing portion 1131 of the turning support 113A and extends in a direction D1A that is substantially perpendicular to the opposing portion 1131 and is a direction opposite to a direction toward the opposing portion 1133. The suction structure 111B is attached to the opposing portion 1131 of the turning support 113B and extends in a direction D1B that is substantially perpendicular to the opposing portion 1131 and is a direction opposite to a direction toward the opposing portion 1133. The intermediate portion 1132 of the turning support 113A is coupled to the base 112A so as to be turnable, and the intermediate portion 1132 of the turning support 113B is coupled to the base 112B so as to be turnable. The opposing portions 1131 and 1133 of the turning support 113A are located away from the fourth axis S4$a$ and the fifth axis S5$a$, and the opposing portions 1131 and 1133 of the turning support 113B are located away from the fourth axis S4$b$ and the fifth axis S5$b$.

Each of the grasping supports 114A and 114B includes a plate-shaped member having an L-shaped section. Each of the grasping supports 114A and 114B includes plate-shaped portions 1141 and 1142 that are substantially perpendicular to each other. The first plate-shaped portion 1141 is detachably joined to the opposing portion 1133. In the present embodiment, the above joining is joining using a bolt but may be joining using any method, such as fitting, adhesion, or welding. The second plate-shaped portion 1142 is arranged at the lateral side of the intermediate portion 1132, is substantially parallel to the fifth axis S5$a$ or S5$b$, and is located away from the fifth axis S5$a$ or S5$b$.

The turning device 115A is arranged at the shorter portion 1122 of the base 112A, is connected to the turning support 113A, and turns the turning support 113A. The turning device 115B is arranged at the shorter portion 1122 of the base 112B, is connected to the turning support 113B, and turns the turning support 113B. Each of the turning devices 115A and 115B includes, for example, an electric motor that uses electric power as a power source. In the present embodiment, each of the turning devices 115A and 115B includes a servomotor. Driving of the turning devices 115A and 115B is controlled by the control device 600.

The grasping structure 116A is attached to the second plate-shaped portion 1142 of the grasping support 114A at an opposite side of the second plate-shaped portion 1142 from the turning support 113A. The grasping structure 116B is attached to the second plate-shaped portion 1142 of the grasping support 114B at an opposite side of the second plate-shaped portion 1142 from the turning support 113B. Each of the grasping structures 116A and 116B includes a pair of grasping claws 1161 and 1162 and a grasping driving device 1163. The grasping claws 1161 and 1162 of the grasping structure 116A extend in the first direction D1A as with the suction structure 111A and are lined up in a second direction D2A$a$ that is a horizontal direction substantially perpendicular to the first direction D1A. The grasping claws 1161 and 1162 of the grasping structure 116B extend in the first direction D1B as with the suction structure 111B and are lined up in a second direction D2B$a$ that is a horizontal direction substantially perpendicular to the first direction D1B. The grasping claws 1161 and 1162 of the first grasping structure 116A are movable in the second directions D2A$a$ and D2A$b$ so as to approach each other or separate from each other. The grasping claws 1161 and 1162 of the second grasping structure 116B are movable in the second directions D2B$a$ and D2B$b$ so as to approach each other or separate from each other. The second directions D2A$a$ and D2A$b$ are directions opposite to each other and are substantially parallel to the fifth axis S5$a$. The second directions D2B$a$ and D2B$b$ are directions opposite to each other and are substantially parallel to the fifth axis S5$b$.

The first grasping structure 116A and the first suction structure 111A are arranged adjacent to each other in a direction intersecting with the first direction D1A. In the present embodiment, the first grasping structure 116A and the first suction structure 111A are arranged adjacent to each other in a direction substantially perpendicular to the first direction D1A and are lined up side by side in a horizontal direction substantially perpendicular to the fifth axis S5$a$ and the second directions D2A$a$ and D2A$b$. However, the present embodiment is not limited to this. The second grasping structure 116B and the second suction structure 111B are arranged adjacent to each other in a direction intersecting with the first direction D1B. In the present embodiment, the second grasping structure 116B and the second suction structure 111B are arranged adjacent to each other in a direction substantially perpendicular to the first direction D1B and are lined up side by side in a horizontal direction substantially perpendicular to the fifth axis S5*b* and the second directions D2Ba and D2Bb. However, the present embodiment is not limited to this.

Moreover, tips of the grasping claws 1161 and 1162 of the first grasping structure 116A are located at positions retreated from a tip of the first suction structure 111A in the first direction D1A, and tips of the grasping claws 1161 and 1162 of the second grasping structure 116B are located at positions retreated from a tip of the second suction structure 111B in the first direction D1B. Therefore, when the end effectors 110A and 110B are lowered with the suction structures 111A and 111B facing the lower side, the suction structures 111A and 111B are brought into contact with a horizontal surface located at the lower side before the grasping claws 1161 and 1162 are brought into contact with the horizontal surface.

The grasping driving device 1163 moves the grasping claws 1161 and 1162 such that the grasping claws 1161 and 1162 approach each other or separate from each other. The grasping driving device 1163 includes, for example, an electric motor that uses electric power as a power source. In the present embodiment, the grasping driving device 1163 includes a servomotor. Driving of the grasping driving device 1163 is controlled by the control device 600. The grasping driving device 1163 is not limited to a motor and may drive the grasping claws 1161 and 1162 by using pneumatic pressure or liquid pressure.

The force sensor 117A detects reaction force that is force acting on the link 124A from the first end effector 110A and outputs the reaction force to the control device 600. The force sensor 117B detects reaction force acting on the link 124B from the second end effector 110B and outputs the reaction force to the control device 600. The reaction force is force received by the end effectors 110A and 110B from the target object and is also acting force applied to the target object by the end effectors 110A and 110B. In the present embodiment, each of the force sensors 117A and 117B detects six axial forces that are forces in directions along three axes orthogonal to each other and rotational forces (also called "moments") about the three axes. However, the present embodiment is not limited to this, and each of the force sensors 117A and 117B may detect at least one axial force.

According to the above configuration, the suction structure 111A and the grasping claws 1161 and 1162 of the grasping structure 116A can take various postures relative to the link 123A and can direct their tips in various directions by turning about the fourth axis S4*a* and turning about the fifth axis S5*a*. The suction structure 111B and the grasping claws 1161 and 1162 of the grasping structure 116B can take various postures relative to the link 123B and can direct their tips in various directions by turning about the fourth axis S4*b* and turning about the fifth axis S5*b*. Moreover, the suction structure 111A and the grasping claws 1161 and 1162 of the grasping structure 116A can change their positions by moving along the circumference of a circle about the fourth axis S4*a* and the circumference of a circle about the fifth axis S5*a*, and the suction structure 111B and the grasping claws 1161 and 1162 of the grasping structure 116B can change their positions by moving along the circumference of a circle about the fourth axis S4*b* and the circumference of a circle about the fifth axis S5*b*.

As shown in FIG. 1, the first conveying device 300 is a device that conveys the workpiece W from the first workspace WS1 to the third workspace WS3. A step performed at the first workspace WS1 is a step performed before a step performed at the third workspace WS3 and is, for example, a step of preparing the workpiece W. The first conveying device 300 includes a transfer device 310, a robot 320, a temporary placing base 330, and a conveyance sensor 340. The transfer device 310 conveys a plate WP, on which the workpieces W are placed, from the first workspace WS1 to a position in front of the robot 320. For example, the transfer device 310 is a transfer device of a conveyor belt type. The robot 320 conveys the workpiece W, located on the plate WP, to a predetermined position on the temporary placing base 330 and places the workpiece W at the predetermined position. The robot 320 is the same in configuration as the robot 100 but is not limited to this. The conveyance sensor 340 detects the workpiece W located at the predetermined position on the temporary placing base 330 and outputs a detection signal indicating this detection to the control device 600. Driving of the components, such as the transfer device 310 and the robot 320, of the first conveying device 300 is controlled by the control device 600.

The second conveying device 400 is a device that conveys the arrangement base 410 from the second workspace WS2 to the third workspace WS3. A step performed at the second workspace WS2 is a step performed before the step performed at the third workspace WS3 and is, for example, a step of arranging magnets 420 at predetermined positions on an arrangement surface 410*a* that is an upper surface of the arrangement base 410. The second conveying device 400 includes the arrangement bases 410, a transfer device 430, and conveyance sensors 440 and 450. The arrangement base 410 is made of a material having magnetism such that the magnets 420 can attract the arrangement base 410 by magnetic force. The magnets 420 are permanent magnets.

The transfer device 430 conveys a transfer base 431, on which the arrangement base 410 including the magnets 420 is placed, from the second workspace WS2 to a position in front of the robot 100. For example, the transfer device 430 is a device that transfers the transfer base 431 by a conveyor belt system. The transfer base 431 can perform an operation of transferring the arrangement base 410 in front of the robot 100 to a transfer device 510 of the third conveying device 500. The conveyance sensor 440 detects the arrangement base 410 located at a predetermined position in front of the robot 100 and outputs a detection signal indicating this detection to the control device 600. The conveyance sensor 450 detects the workpiece W located on the arrangement base 410 at the predetermined position and outputs a detection signal indicating this detection to the control device 600. Driving of the components, such as the transfer device 430, of the second conveying device 400 is controlled by the control device 600. The magnet 420 is one example of an auxiliary member.

The third conveying device 500 is a device that conveys the arrangement base 410 from the third workspace WS3 to the fourth workspace WS4. A step performed at the fourth workspace WS4 is a step performed after the step performed at the third workspace WS3 and is, for example, a step of pressure-joining electronic components, such as terminals, connectors, tabs, and converters, to the workpiece W on the arrangement base 410. The third conveying device 500 includes the transfer device 510 and a conveyance sensor 520. The transfer device 510 conveys a transfer base 511, on which the arrangement base 410 including the workpiece W is placed, from the position in front of the robot 100 to a pressure-joining device (not shown) located at the fourth workspace WS4. For example, the transfer device 510 is a device that transfers the transfer base 511 by a conveyor belt system. The conveyance sensor 520 detects the arrangement base 410 located at a predetermined position on the transfer device 510 and outputs a detection signal indicating this detection to the control device 600. Driving of the components, such as the transfer device 510, of the third conveying device 500 is controlled by the control device 600.

The configurations of the conveying devices 300 to 500 are not limited to the above configurations, and the conveying devices 300 to 500 may convey the target object between the workspaces. For example, each of the conveying devices 300 to 500 may include a conveyor belt, a carrier, a track device, a conveyance device including a ball screw structure, a conveyance device including a rack-and-pinion structure, a robot, and/or the like. The conveyance sensors 340, 440, 450, and 520 may be sensors that can detect the existence of the target object, such as the workpiece W or the arrangement base 410. For example, each of the conveyance sensors 340, 440, 450, and 520 may be a photoelectronic sensor (also called a "beam sensor"), a laser sensor, a limit switch, a contact sensor, or the like.

The position detector 200 is arranged in a work range of the robot 100. The position detector 200 detects the position of the workpiece W held by the end effectors 110A and 110B and outputs a detection result to the control device 600. The position detector 200 includes sensors that detect the workpiece W. In the present embodiment, the position detector 200 includes three sensors 201a to 201c. The sensors 201a to 201c are arranged at respective height positions that are the same in height as each other in the vertical direction. The sensors 201a to 201c are arranged so as to form sides of a right angled triangle, the sides extending in the horizontal direction. The sensors 201a and 201b are arranged on along side of the right angled triangle so as to be spaced apart from each other. The sensor 201c is arranged on a short side of the right angled triangle.

Each of the sensors 201a to 201c may detect the position of the workpiece W relative to the sensor and may be a photoelectronic sensor, a laser sensor, or the like. For example, each of the sensors 201a to 201c includes a light emitter and a light receiver which are arranged so as to be opposed to each other in the vertical direction and detects the workpiece W located between the light emitter and the light receiver.

Hardware Configuration of Control Device

Figure 5:
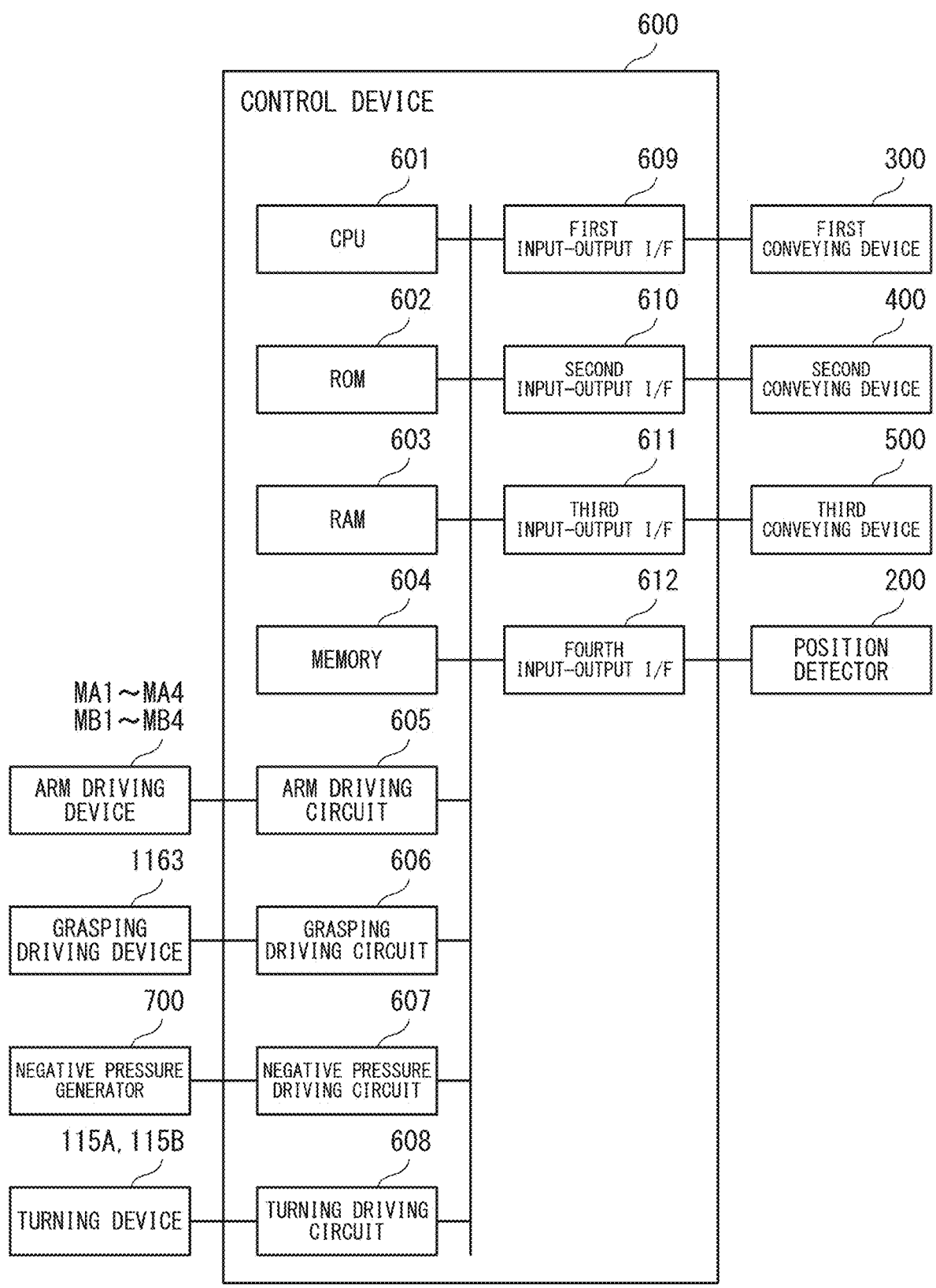
FIG. 5 is a block diagram showing one example of the hardware configuration of a control device according to the embodiment.

The hardware configuration of the control device 600 will be described. FIG. 5 is a block diagram showing one example of the hardware configuration of the control device 600 according to the embodiment. As shown in FIG. 5, the control device 600 includes a CPU (Central Processing Unit) 601, a ROM (Read Only Memory) 602, a RAM (Random Access Memory) 603, a memory 604, an arm driving circuit 605, a grasping driving circuit 606, a negative pressure driving circuit 607, a turning driving circuit 608, and input-output I/Fs (Interfaces) 609 to 612 as components. The above components are connected to each other through buses, wired communication, or wireless communication. Not all the components are essential. For example, some of the above components may be arranged outside the control device 600 and connected to the control device 600.

For example, the CPU 601 is a processor and controls the overall operation of the control device 600. The ROM 602 includes, for example, a non-volatile semiconductor memory and stores programs, data, and the like which make the CPU 601 control the operation. The RAM 603 includes, for example, a volatile semiconductor memory and temporarily stores the programs executed by the CPU 601, data in the middle of processing by the CPU 601, data after processing by the CPU 601, and the like. The memory 604 includes a storage device such as a semiconductor memory (such as a volatile memory or a non-volatile memory), a hard disk drive (HDD) or a SSD (Solid State Drive) and stores various kinds of information.

For example, the programs by which the CPU 601 operates are stored in the ROM 602 or the memory 604 in advance. The CPU 601 reads and expands the program from the ROM 602 or the memory 604 to the RAM 603. The CPU 601 executes coded commands in the program expanded in the RAM 603.

The functions of the control device 600 may be realized by a computer system including the CPU 601, the ROM 602, the RAM 603, and the like, may be realized by a dedicated hardware circuit, such as an electronic circuit or an integrated circuit, or may be realized by a combination of the computer system and the hardware circuit.

In accordance with the command of the CPU 601, the arm driving circuit 605 supplies electric power to the servomotors of the arm driving devices MA1 to MA4 and MB1 to MB4 of the robot arms 120A and 120B to control the driving of the servomotors. In accordance with the command of the CPU 601, the grasping driving circuit 606 supplies electric power to the servomotors of the grasping driving devices 1163 of the grasping structures 116A and 116B to control the driving of the servomotors. In accordance with the command of the CPU 601, the negative pressure driving circuit 607 controls the driving of the negative pressure generator 700 and the driving of an on-off valve (not shown) disposed at a pipe connecting the negative pressure generator 700 and the suction structure 111A and an on-off valve (not shown) disposed at a pipe connecting the negative pressure generator 700 and the suction structure 111B, to control the negative pressure generated at the suction structures 111A and 111B. In accordance with the command of the CPU 601, the turning driving circuit 608 supplies electric power to the servomotors of the turning devices 115A and 115B of the end effectors 110A and 110B to control the driving of the servomotors.

The first input-output I/F 609 is connected to the components, such as the transfer device 310, the robot 320, and the conveyance sensor 340, of the first conveying device 300 and receives or outputs information, data, commands, and the like from or to the components. The second input-output I/F 610 is connected to the components, such as the transfer device 430 and the conveyance sensors 440 and 450, of the second conveying device 400 and receives or outputs information, data, commands, and the like from or to the components. The third input-output I/F 611 is connected to the components, such as the transfer device 510 and the conveyance sensor 520, of the third conveying device 500 and receives or outputs information, data, commands, and the like from or to the components. The fourth input-output I/F 612 is connected to the sensors 201a to 201c of the position detector 200 and receives or outputs commands, detection signals, and the like from or to the sensors 201a to 201c.

Functional Configuration of Control Device

Figure 6:
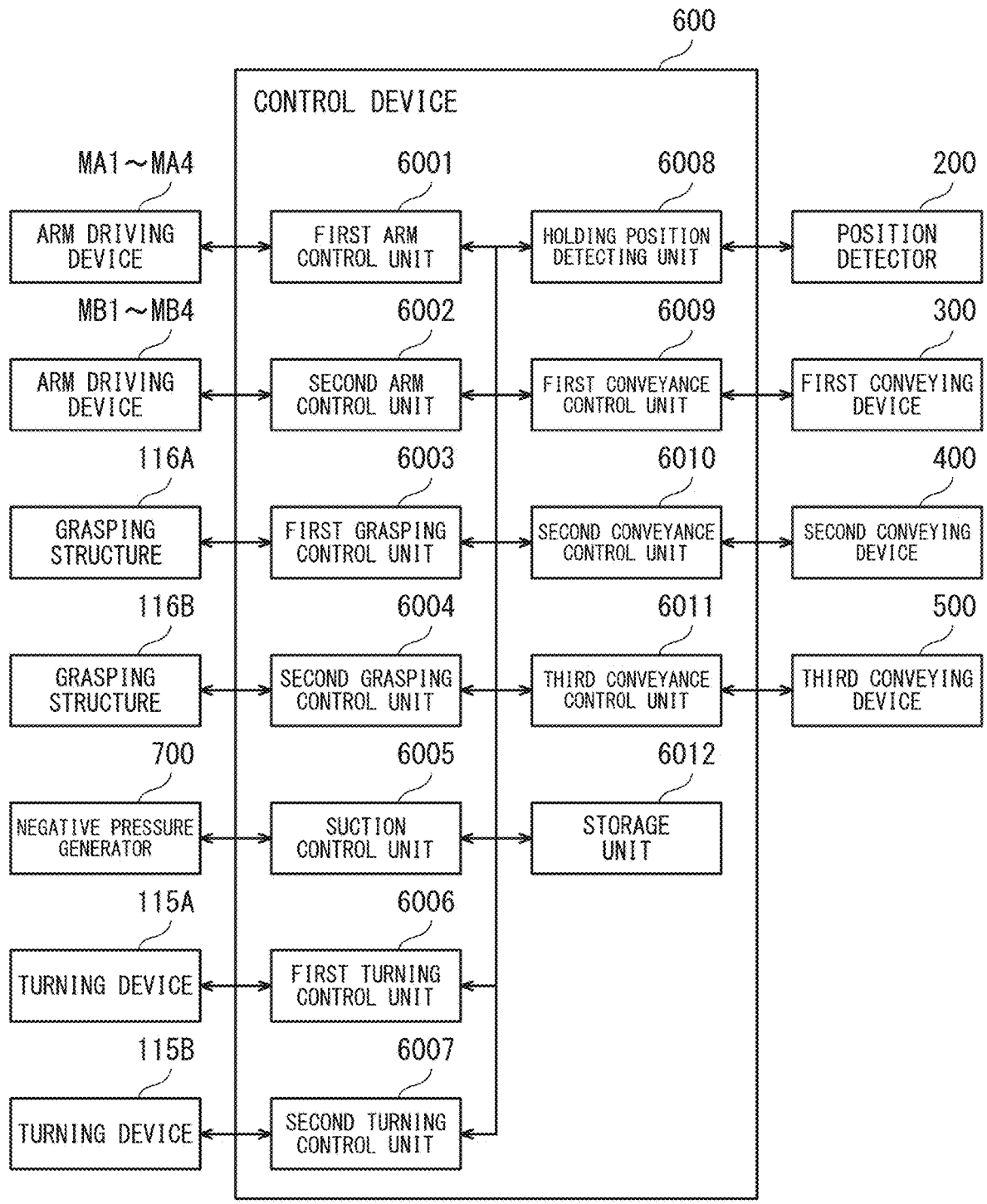
FIG. 6 is a block diagram showing one example of the functional configuration of the control device according to the embodiment.

The functional configuration of the control device 600 will be described. FIG. 6 is a block diagram showing one example of the functional configuration of the control device 600 according to the embodiment. As shown in FIG. 6, the control device 600 includes a first arm control unit 6001, a second arm control unit 6002, a first grasping control unit 6003, a second grasping control unit 6004, a suction control unit 6005, a first turning control unit 6006, a second turning control unit 6007, a holding position detecting unit 6008, a first conveyance control unit 6009, a second conveyance control unit 6010, a third conveyance control unit 6011, and a storage unit 6012 as the functional components. Not all the functional components are essential. The functions of the functional components except for the storage unit 6012 are realized by the CPU 601 or the like, and the functions of the storage unit 6012 are realized by the memory 604, the ROM 602, and/or the RAM 603.

The storage unit 6012 stores various kinds of information therein and allows the stored information to be read. For example, the storage unit 6012 may store therein programs which make the control device 600 operate. The storage unit 6012 may store therein workpiece information regarding the shape, size, and the like of the workpiece that is a conveyance target of the robot 100. The storage unit 6012 may store therein positional information regarding, for example, three-dimensional positions of the sensors 201a to 201c of the position detector 200. The three-dimensional positions are positions in a three-dimensional space where the robot system 1 is arranged.

The first arm control unit 6001 makes the first robot arm 120A autonomously execute predetermined work in accordance with the program. The first arm control unit 6001 outputs commands of operating the arm driving devices MA1 to MA4, to the arm driving devices MA1 to MA4. With this, the arm driving devices MA1 to MA4 drive such that the first robot arm 120A moves the first end effector 110A based on the position, posture, position movement speed, posture movement speed, and acting force corresponding to the predetermined work.

The second arm control unit 6002 makes the second robot arm 120B autonomously execute predetermined work in accordance with the program. The second arm control unit 6002 outputs commands of operating the arm driving devices MB1 to MB4, to the arm driving devices MB1 to MB4. With this, the arm driving devices MB1 to MB4 drive such that the second robot arm 120B moves the second end effector 110B based on the position, posture, position movement speed, posture movement speed, and acting force corresponding to the predetermined work.

Each of the arm driving devices MA1 to MA4 and MB1 to MB4 includes: a rotation sensor (not shown), such as an encoder, which detects a rotation amount of a rotor of the servomotor; and a current sensor (not shown) that detects a driving current of the servomotor. The arm control unit 6001 controls the driving, such as rotation start, rotation stop, rotational speed, and rotational torque, of the servomotors by using, as feedback information, the rotation amounts and driving current values output from the rotation sensors and current sensors of the servomotors and the magnitudes and directions of the forces output from the force sensor 117A. The arm control unit 6002 controls the driving, such as rotation start, rotation stop, rotational speed, and rotational torque, of the servomotors by using, as feedback information, the rotation amounts and driving current values output from the rotation sensors and current sensors of the servomotors and the magnitudes and directions of the forces output from the force sensor 117B. Each of the arm control units 6001 and 6002 may use, as the feedback information, a command value of the driving current output from the arm driving circuit 605 to each servomotor.

The first grasping control unit 6003 makes the first grasping structure 116A autonomously execute a predetermined operation in accordance with the program. The first grasping control unit 6003 outputs a command of operating the grasping driving device 1163 of the first grasping structure 116A, to the grasping driving device 1163. With this, the grasping driving device 1163 drives the grasping claws 1161 and 1162 of the first grasping structure 116A to move the grasping claws 1161 and 1162 in accordance with the predetermined operation.

The second grasping control unit 6004 makes the second grasping structure 116B autonomously execute the predetermined operation in accordance with the program. The second grasping control unit 6004 outputs a command of operating the grasping driving device 1163 of the second grasping structure 116B, to the grasping driving device 1163. With this, the grasping driving device 1163 drives the grasping claws 1161 and 1162 of the second grasping structure 116B to move the grasping claws 1161 and 1162 in accordance with the predetermined operation.

The grasping control unit 6003 controls the driving of the servomotor included in the grasping driving device 1163 of the grasping structure 116A by using, as the feedback information, the rotation amount and driving current value output from the rotation sensor (not shown) and current sensor (not shown) of the servomotor. The grasping control unit 6004 controls the driving of the servomotor included in the grasping driving device 1163 of the grasping structure 116B by using, as the feedback information, the rotation amount and driving current value output from the rotation sensor (not shown) and current sensor (not shown) of the servomotor. Each of the grasping control units 6003 and 6004 may use, as the feedback information, the command value of the driving current output from the grasping driving circuit 606 to each servomotor.

The suction control unit 6005 generates the negative pressure at the suction structures 111A and 111B in accordance with the program. The suction control unit 6005 controls the operation of the negative pressure generator 700 by outputting a command of operating the negative pressure generator 700, to the negative pressure generator 700. The suction control unit 6005 controls the negative pressure generated at the first suction structure 111A by outputting a command of operating the on-off valve (not shown) of the pipe communicating the first suction structure 111A with the negative pressure generator 700, to the on-off valve (not shown) of the pipe. The suction control unit 6005 controls the negative pressure generated at the second suction structure 111B by outputting a command of operating the on-off valve (not shown) of the pipe communicating the second suction structure 111B with the negative pressure generator 700, to the on-off valve (not shown) of the pipe.

The first turning control unit 6006 makes the first turning device 115A of the first end effector 110A autonomously execute a predetermined operation in accordance with the program. The first turning control unit 6006 outputs a command of operating the first turning device 115A, to the first turning device 115A. With this, the first turning device 115A drives the first turning support 113A to move the first turning support 113A based on the posture and posture movement speed corresponding to the predetermined operation.

The second turning control unit 6007 makes the second turning device 115B of the second end effector 110B autonomously execute a predetermined operation in accordance with the program. The second turning control unit 6007 outputs a command of operating the second turning device 115B, to the second turning device 115B. With this, the second turning device 115B drives the second turning support 113B to move the second turning support 113B based on the posture and posture movement speed corresponding to the predetermined operation.

The turning control unit 6006 controls the driving of the servomotor included in the turning device 115A by using, as the feedback information, the rotation amount and driving current value output from the rotation sensor (not shown) and current sensor (not shown) of the servomotor. The turning control unit 6007 controls the driving of the servomotor included in the turning device 114B by using, as the feedback information, the rotation amount and driving current value output from the rotation sensor (not shown) and current sensor (not shown) of the servomotor. Each of the turning control units 6006 and 6007 may use, as the feedback information, the command value of the driving current output from the turning driving circuit 608 to each servomotor.

The holding position detecting unit 6008 detects a relative positional relation among the end effectors 110A and 110B and the workpiece W held by the end effectors 110A and 110B. Specifically, the holding position detecting unit 6008 detects a relative positional relation among the suction structures 111A and 111B and the workpiece W. The control device 600 performs the positioning of the workpiece W during the operation of the robot 100 based on the above positional relation.

Specifically, when the control device 600 makes the robot 100 hold the workpiece W, the control device 600 makes the suction structures 111A and 111B suck the workpiece W at positions close to both ends of the workpiece W in a longitudinal direction DW1. When the control device 600 makes the position detector 200 sense the held workpiece W, the control device 600 moves the workpiece W toward the sensors 201a and 201b and makes the sensors 201a and 201b detect an edge W1 of the workpiece W in the longitudinal direction DW1, and also moves the workpiece W toward the sensor 201c and makes the sensor 201c detect an edge W2 of the workpiece W in a transverse direction DW2. The transverse direction DW2 is a direction orthogonal to the longitudinal direction DW1.

The holding position detecting unit 6008 detects the positions and postures of the suction structures 111A and 111B at respective timings at which the sensors 201a to 201c detect the workpiece W. The positions and postures of the suction structures 111A and 111B may be three-dimensional positions and three-dimensional postures. The three-dimensional posture is a posture in a three-dimensional space where the robot system 1 is arranged. For example, the three-dimensional posture may be posture angles around three axes orthogonal to each other.

Moreover, the holding position detecting unit 6008 reads the workpiece information of the workpiece W and the positional information of the sensors 201a to 201c from the storage unit 6012. The holding position detecting unit 6008 detects relative positions and postures of the edges W1 and W2 of the workpiece W with respect to the suction structures 111A and 111B based on the shape and size of the workpiece W, the three-dimensional positions of the sensors 201a and 201b, and the positions and postures of the suction structures 111A and 111B at respective timings.

As above, the holding position detecting unit 6008 detects a relative positional relation among the workpiece W and the suction structures 111A and 111B by detecting the relative positions and postures of the edges W1 and W2 of the workpiece W with respect to the suction structures 111A and 111B.

The holding position detecting unit 6008 may detect the positions and postures of the suction structures 111A and 111B as below. The holding position detecting unit 6008 detects the position and posture of the first end effector 110A based on the detected values of the rotation sensors of the arm driving devices MA1 to MA4. For example, the position and posture of the first end effector 110A may be the three-dimensional position of a connecting portion between the first end effector 110A and the link 124A at a position of the fourth axis S4a and the three-dimensional posture of the connecting portion at a position of the fourth axis S4a. Moreover, the holding position detecting unit 6008 detects the position and posture of the first suction structure 111A based on the position and posture of the first end effector 110A and the detected value of the rotation sensor of the first turning device 115A.

Similarly, the holding position detecting unit 6008 detects the position and posture of the second end effector 110B based on the detected values of the rotation sensors of the arm driving devices MB1 to MB4. Moreover, the holding position detecting unit 6008 detects the position and posture of the second suction structure 111B based on the position and posture of the second end effector 110B and the detected value of the rotation sensor of the second turning device 115B.

The first conveyance control unit 6009 makes the transfer device 310 and the robot 320 of the first conveying device 300 autonomously convey the workpiece W in accordance with the program. For example, when the workpiece W on the temporary placing base 330 is removed by the robot 100, and therefore, the conveyance sensor 340 stops outputting the detection signal of the workpiece W, the first conveyance control unit 6009 outputs a command of conveying the workpiece W to the temporary placing base 330, to the robot 320. To be specific, the first conveyance control unit 6009 controls the driving of the robot 320 such that each time the workpiece W is removed from the temporary placing base 330, the next workpiece W is conveyed to the temporary placing base 330. Moreover, when all the workpieces W on the plate WP conveyed by the transfer device 310 are conveyed by the robot 320, and the plate WP is removed from the transfer device 310 by the robot 320, the first conveyance control unit 6009 outputs a command of conveying the next plate WP, to the transfer device 310. Instead of the detection signal of the conveyance sensor 340, the first conveyance control unit 6009 may receive, from the arm control unit 6001, 6002, or the like, information indicating that the workpiece W is removed from the temporary placing base 330, and may output the above command based on this information.

The second conveyance control unit 6010 makes the transfer device 430 of the second conveying device 400 autonomously convey the arrangement base 410 in accordance with the program. For example, when the workpiece W is arranged by the robot 100 on the arrangement surface 410a of the arrangement base 410 located in front of the robot 100, and therefore, the conveyance sensor 450 outputs the detection signal of the workpiece W, the second conveyance control unit 6010 outputs a command of moving the arrangement base 410 to the transfer device 510, to the transfer device 430. Moreover, when the arrangement base 410 in front of the robot 100 is moved to the transfer device 510, the second conveyance control unit 6010 outputs a command of conveying the next arrangement base 410 to a position in front of the robot 100, to the transfer device 430. Then, when the conveyance sensor 440 outputs the detection signal of the arrangement base 410, the second conveyance control unit 6010 stops the conveyance of the transfer device 430. Instead of the detection signal of the conveyance sensor 450, the second conveyance control unit 6010 may receive, from the arm control unit 6001, 6002, or the like, information indicating that the workpiece W is arranged at the arrangement base 410, and may output the above command based on this information.

The third conveyance control unit 6011 makes the transfer device 510 of the third conveying device 500 autonomously convey the arrangement base 410 in accordance with the program. For example, when the arrangement base 410 is moved to the transfer device 510 by the transfer device 430, and therefore, the conveyance sensor 520 outputs the detection signal of the arrangement base 410, the third conveyance control unit 6011 outputs a command of conveying the arrangement base 410 to the fourth workspace WS4, to the transfer device 510. Instead of the detection signal of the conveyance sensor 520, the third conveyance control unit 6011 may receive, from the second conveyance control unit 6010 or the like, information indicating that the arrangement base 410 is moved to the transfer device 510, and may output the above command based on this information.

Operations of Robot System

Figure 7:
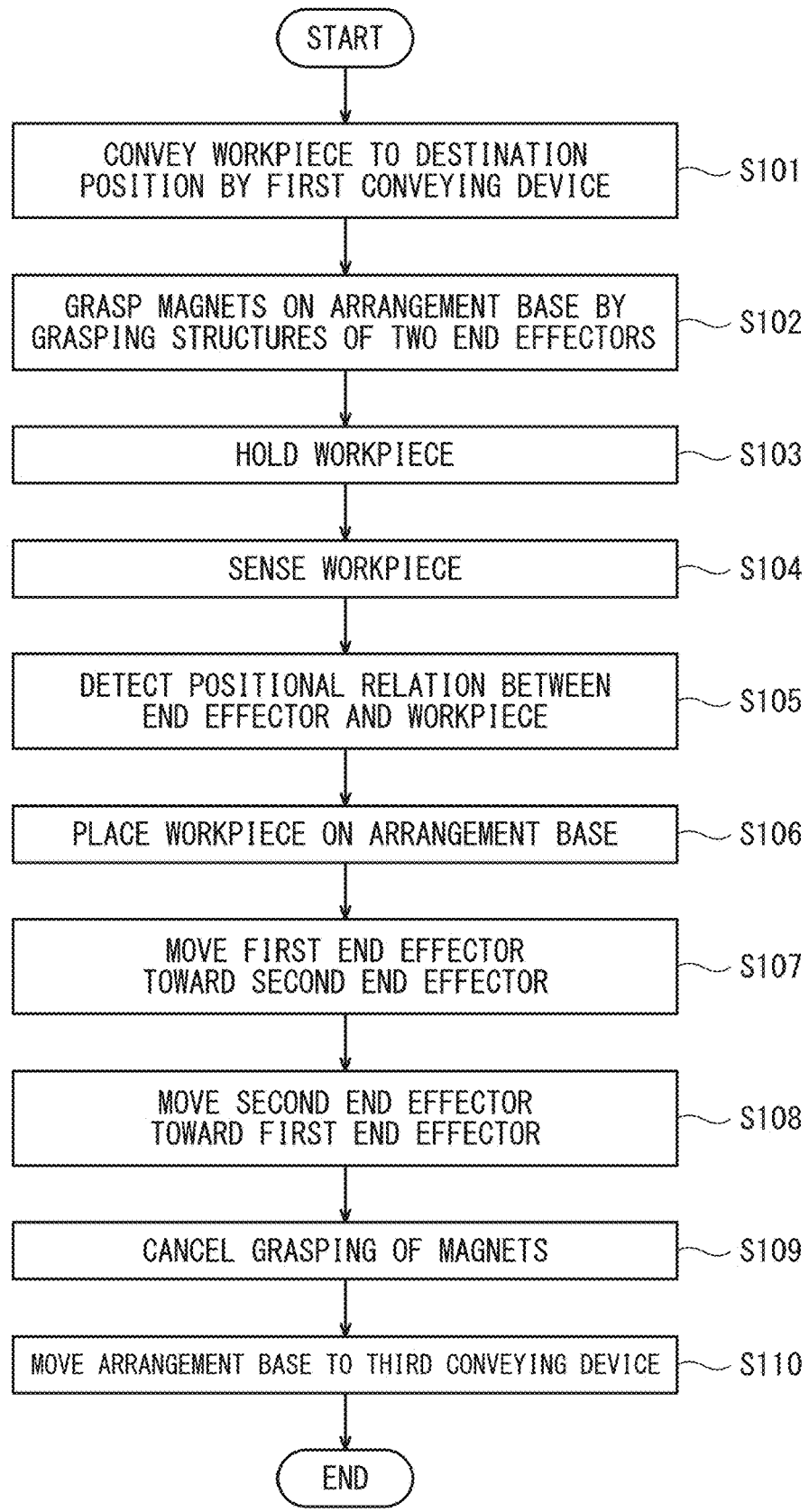
FIG. 7 is a flow chart showing one example of the operation of the robot system according to the embodiment.

The operations of the robot system 1 according to the embodiment will be described with reference to FIG. 7. FIG. 7 is a flow chart showing one example of the operation of the robot system 1 according to the embodiment. FIGS. 8 to 14 are perspective views each showing one example of the state of the robot system 1 that is operating in accordance with the flow chart of FIG. 7.

As shown in FIG. 1, in Step S101, the control device 600 makes the transfer device 310 of the first conveying device 300 convey the plate WP, on which the workpieces W are placed, from the first workspace WS1 to a position in front of the robot 320. Moreover, the control device 600 makes the robot 320 convey the workpiece W from the plate WP to a predetermined position on the temporary placing base 330, the predetermined position being a destination position of the second workspace WS2.

Figure 8:
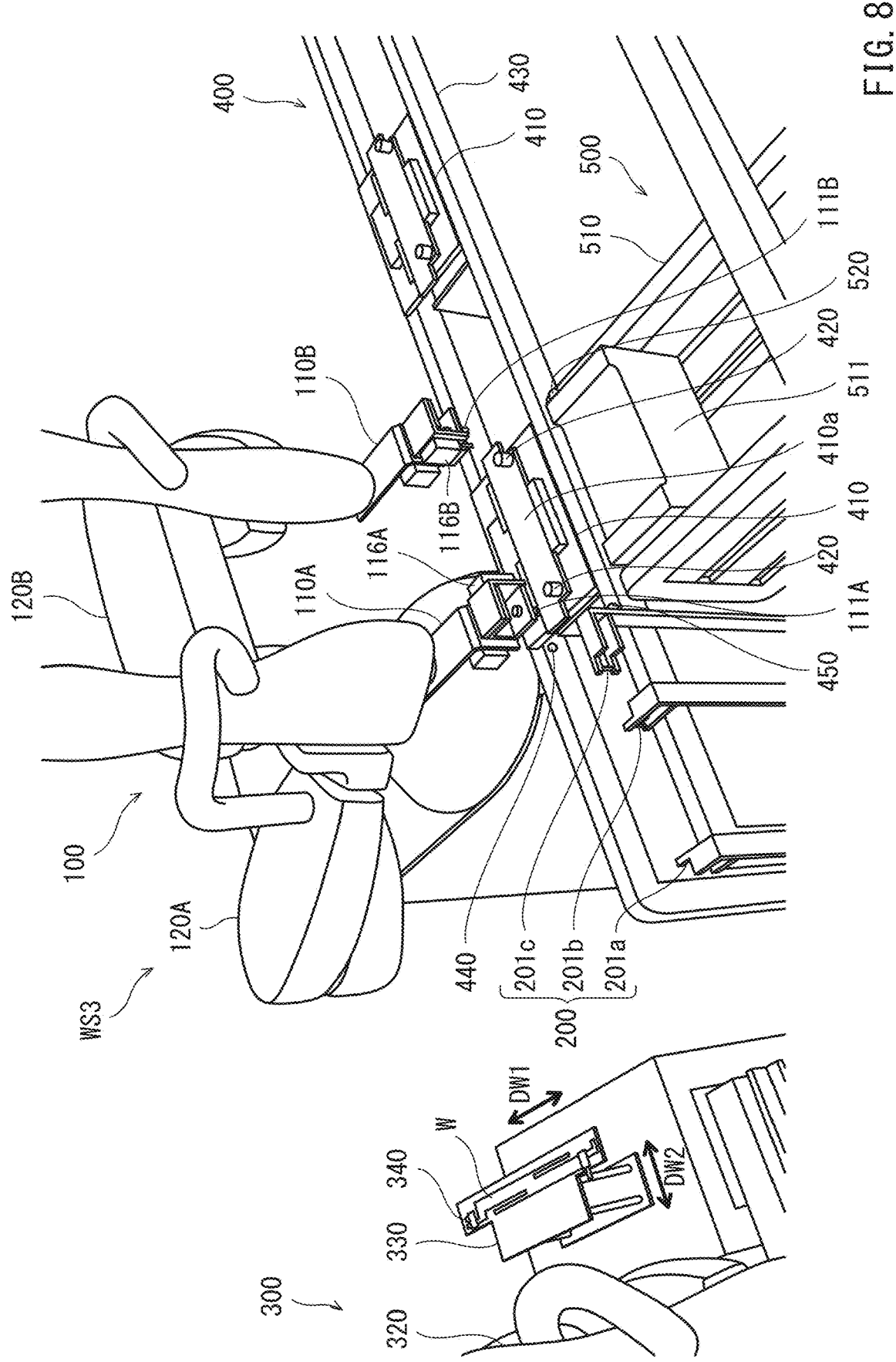
FIG. 8 is a perspective view showing one example of the state of the robot system that is operating in accordance with the flow chart of FIG. 7.

Next, in Step S102, as shown in FIG. 8, the control device 600 detects the existence of the workpiece W on the temporary placing base 330 based on the detection signal of the conveyance sensor 340. After the detection, the control device 600 makes the robot arms 120A and 120B of the robot 100 move the end effectors 110A and 110B to the upper side of the arrangement base 410 of the second conveying device 400. The arrangement base 410 is an arrangement base located at a predetermined position in front of the robot 100, and the control device 600 detects the existence of the arrangement base 410 based on the detection signal of the conveyance sensor 440. Moreover, the control device 600 makes the robot arms 120A and 120B lower the end effectors 110A and 110B and makes the grasping structures 116A and 116B grasp the two magnets 420 on the arrangement base 410 by using the grasping claws 1161 and 1162 (see FIGS. 3 and 4). In Step S102 and the subsequent steps, the grasping claws 1161 and 1162 of the grasping structures 116A and 116B and the suction structures 111A and 111B are directed toward the lower side.

Figure 9:
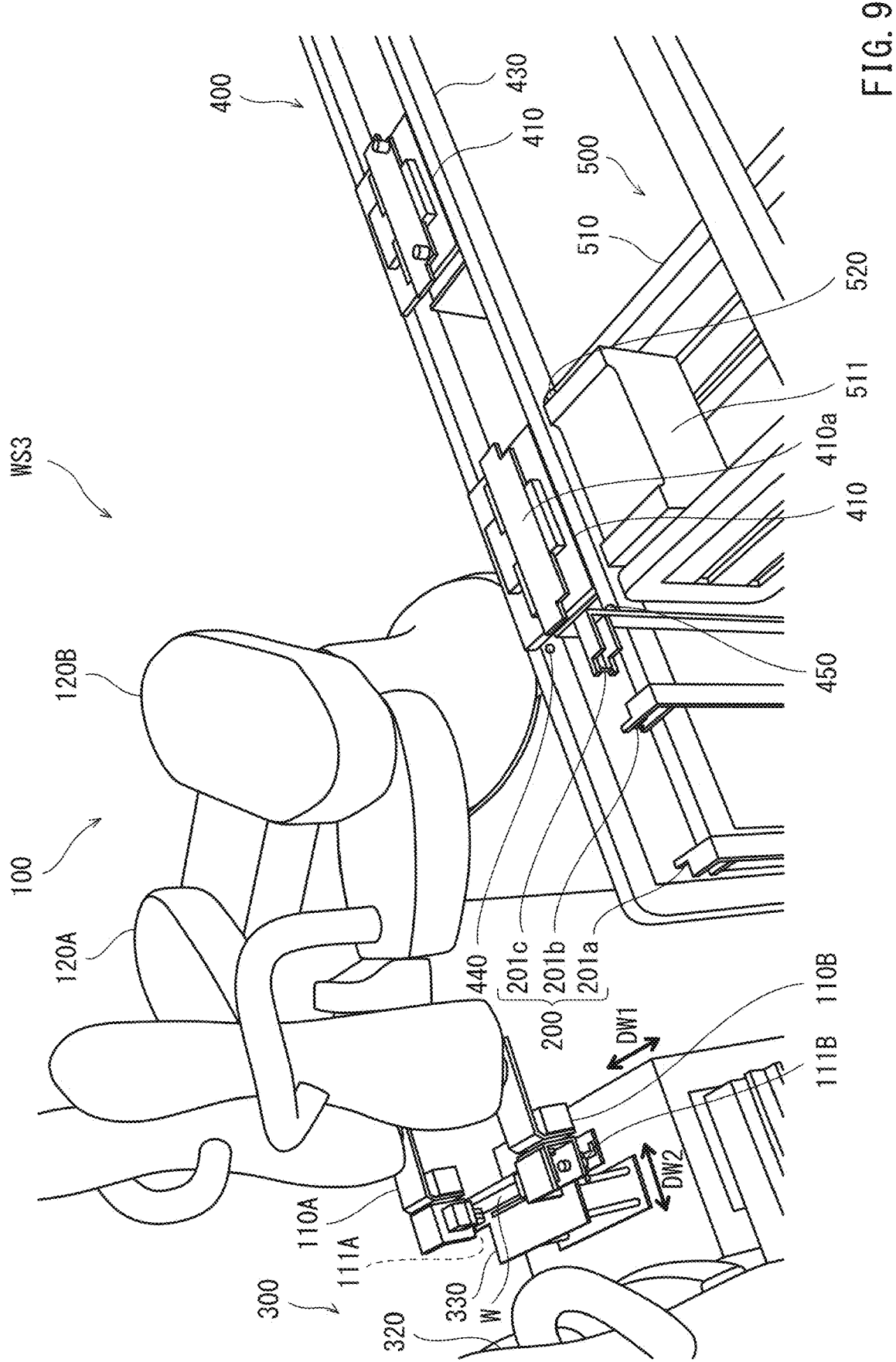
FIG. 9 is a perspective view showing one example of the state of the robot system that is operating in accordance with the flow chart of FIG. 7.

Next, in Step S103, as shown in FIG. 9, the control device 600 makes the robot arms 120A and 120B move the end effectors 110A and 110B, which grasp the magnets 420, to the upper side of both ends of the workpiece W in the longitudinal direction DW1 on the temporary placing base 330 and makes the end effectors 110A and 110B hold the workpiece W. Specifically, the control device 600 drives the negative pressure generator 700 (see FIG. 5) in advance. The control device 600 lowers the end effectors 110A and 110B located at the upper side of the workpiece W and opens the on-off valves (not shown) at a timing at which the suction structures 111A and 111B approach or contact both ends of the workpiece W. With this, the control device 600 makes the suction structures 111A and 111B suck the workpiece W.

Figure 10:
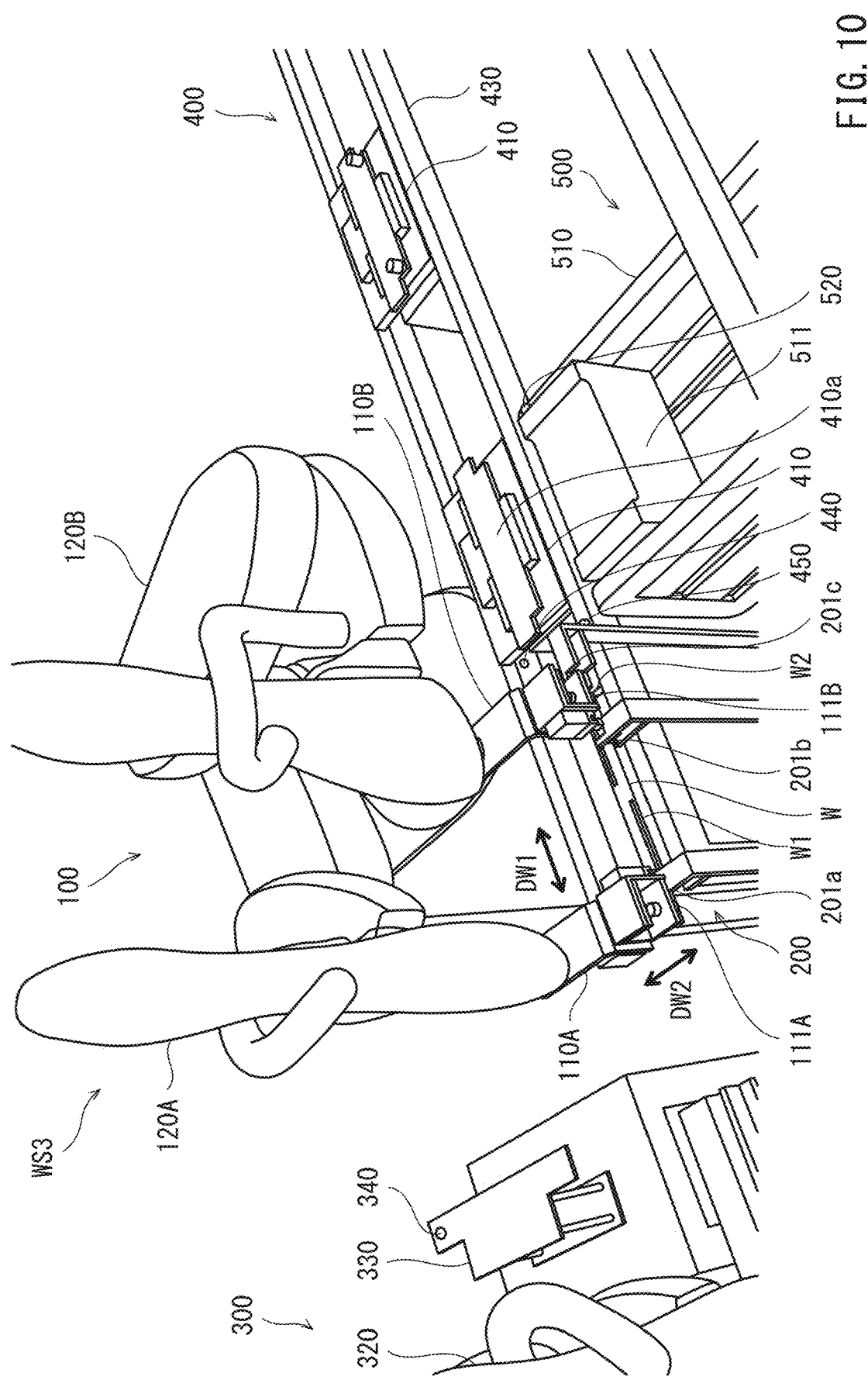
FIG. 10 is a perspective view showing one example of the state of the robot system that is operating in accordance with the flow chart of FIG. 7.

Next, in Step S104, as shown in FIG. 10, the control device 600 makes the robot arms 120A and 120B move the workpiece W to the position detector 200 and makes the position detector 200 sense the workpiece W. For example, the control device 600 moves the workpiece W such that the edge W1 approaches the sensors 201a and 201b, and with this, the edge W1 is detected by the sensors 201a and 201b. Moreover, the control device 600 moves the workpiece W such that the edge W2 approaches the sensor 201c, and with this, the edge W2 is detected by the sensor 201c.

Next, in Step S105, based on the detection results of the sensors 201a to 201c and the like, the control device 600 detects a relative positional relation among the suction structures 111A and 111B and the workpiece W. i.e., a relative positional relation among the end effectors 110A and 110B and the workpiece W.

Figure 11:
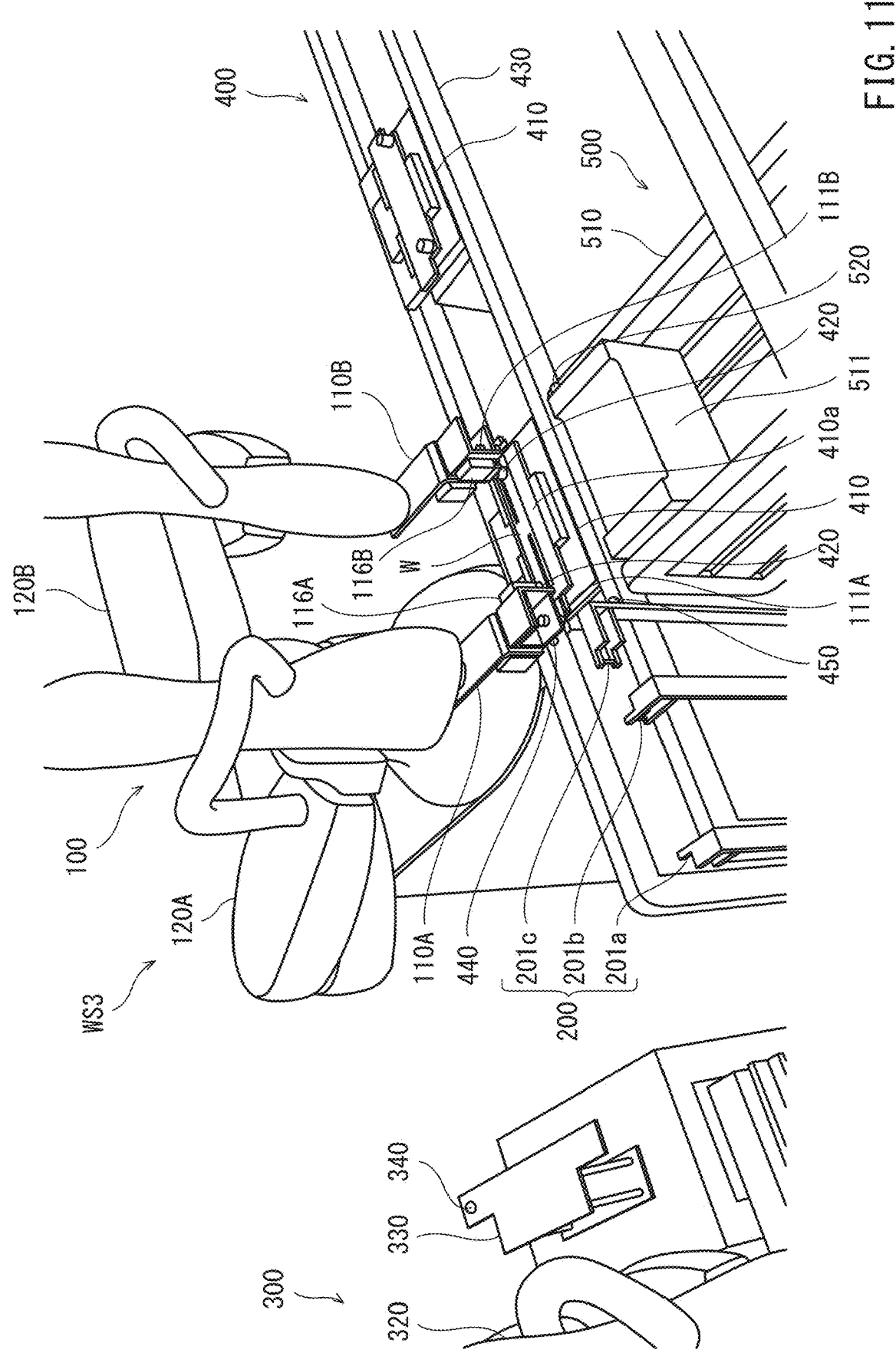
FIG. 11 is a perspective view showing one example of the state of the robot system that is operating in accordance with the flow chart of FIG. 7.

Next, in Step S106, the control device 600 makes the robot arms 120A and 120B move the end effectors 110A and 110B, which hold the workpiece W, to the upper side of the arrangement base 410. The arrangement base 410 is an arrangement base from which the magnets 420 are removed in Step S102. Moreover, as shown in FIG. 11, the control device 600 makes the robot arms 120A and 120B lower the end effectors 110A and 110B and place the workpiece W at a predetermined position on the arrangement surface 410a of the arrangement base 410. The control device 600 can detect the contact between the workpiece W and the arrangement base 410 based on the detection signals of the force sensors 117A and 117B. At this time, the control device 600 performs the positioning of the workpiece W relative to the arrangement base 410 based on the positional relation detected in Step S105.

Figure 12:
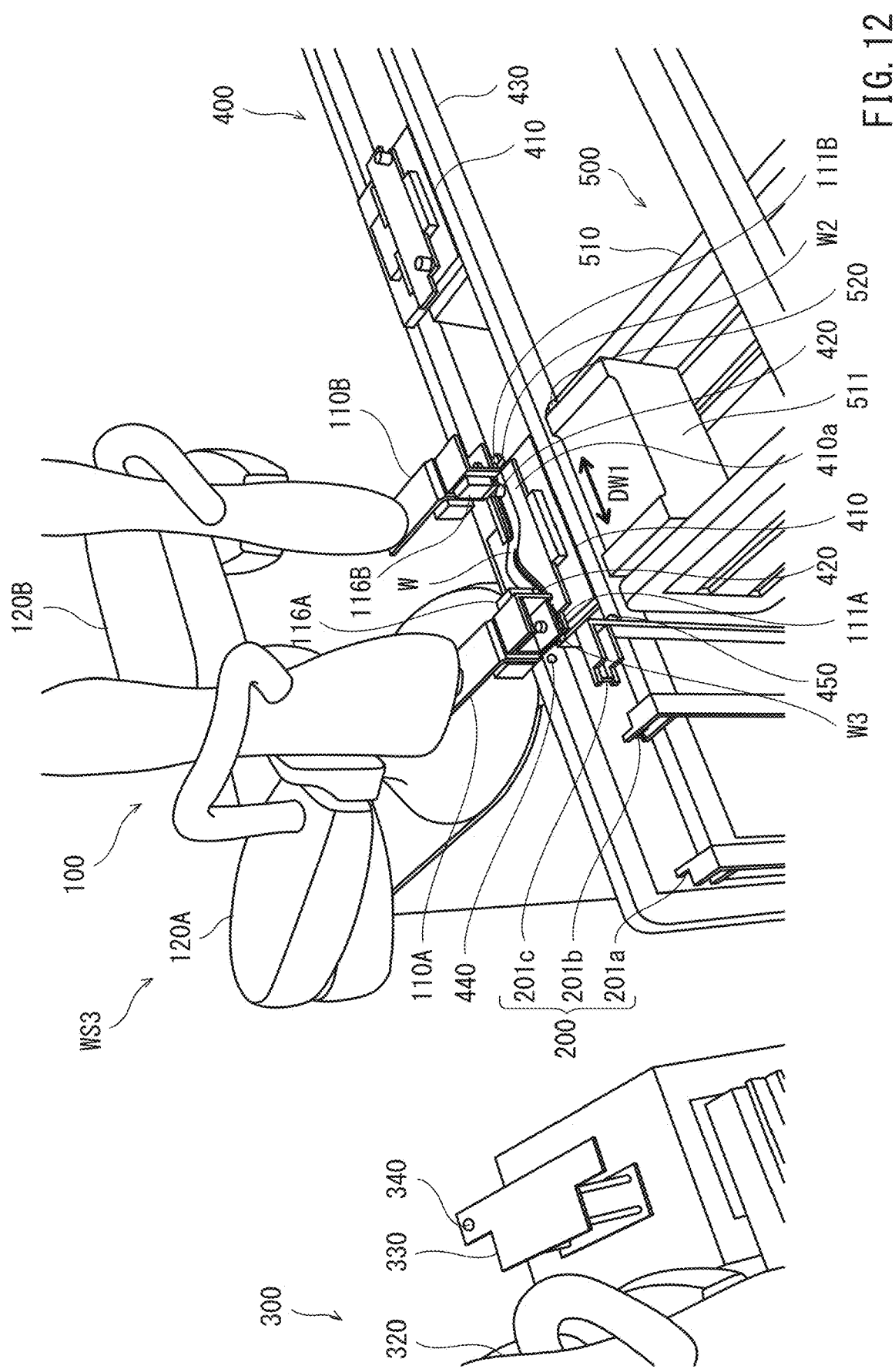
FIG. 12 is a perspective view showing one example of the state of the robot system that is operating in accordance with the flow chart of FIG. 7.

Next, in Step S107, as shown in FIG. 12, the control device 600 makes the first robot arm 120A move the first end effector 110A toward the second end effector 110B. Specifically, the control device 600 moves the first suction structure 111A toward the second suction structure 111B in the longitudinal direction DW1 of the workpiece W. At this time, based on the positional relation detected in Step S105, the control device 600 makes the position of an edge W3 of the workpiece W coincide with a predetermined position on the arrangement base 410. The edge W3 is an edge of the workpiece W and is located at an opposite side of the workpiece W from the edge W2.

Figure 13:
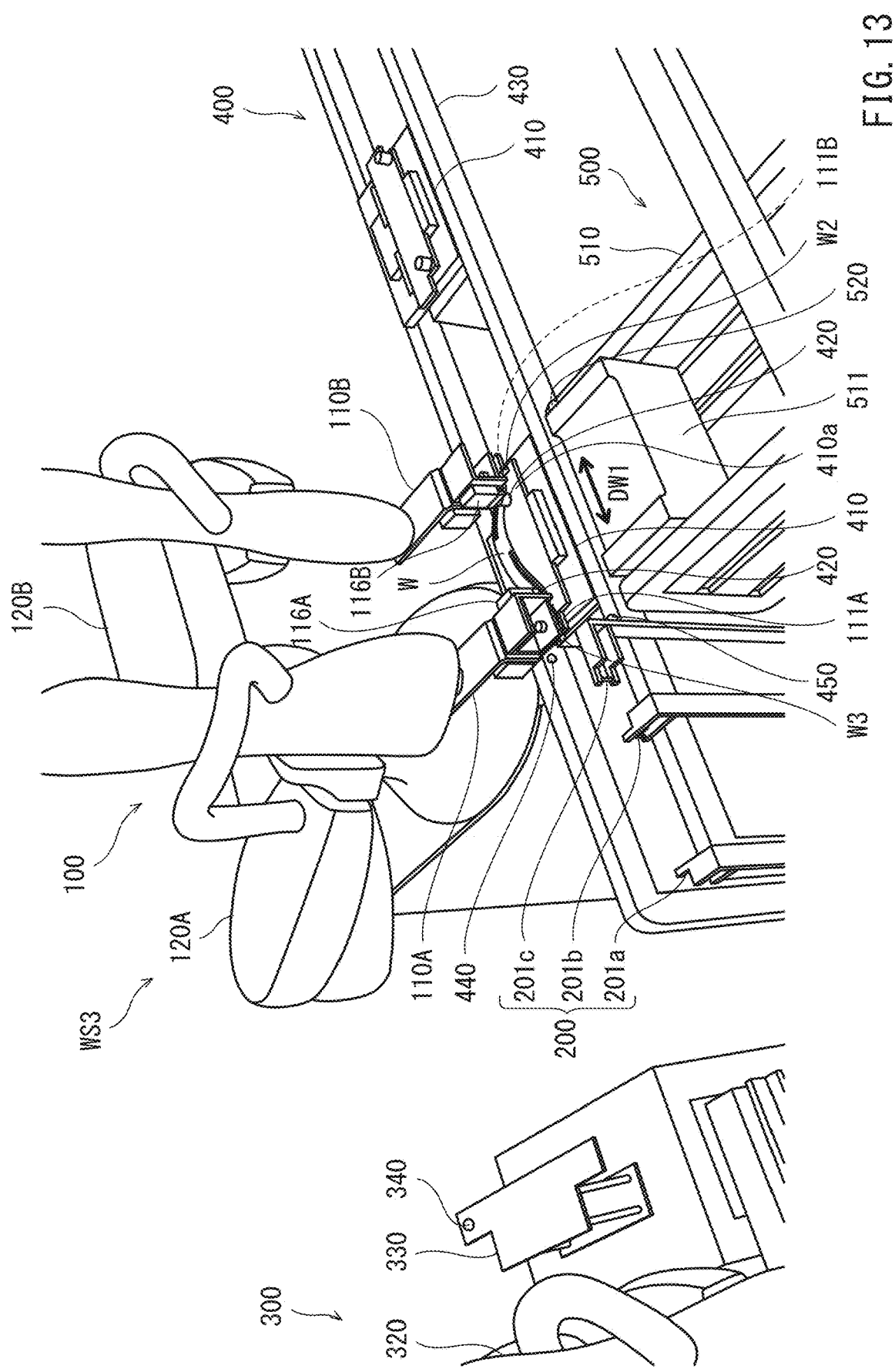
FIG. 13 is a perspective view showing one example of the state of the robot system that is operating in accordance with the flow chart of FIG. 7.

Next, in Step S108, as shown in FIG. 13, the control device 600 makes the second robot arm 120B move the second end effector 110B toward the first end effector 110A. Specifically, the control device 600 moves the second suction structure 111B toward the first suction structure 111A in the longitudinal direction DW1. At this time, based on the positional relation detected in Step S105, the control device 600 makes the position of the edge W2 of the workpiece W coincide with a predetermined position on the arrangement base 410. With this, the workpiece W is bent so as to swell at the middle thereof.

Next, in Step S109, the control device 600 makes the robot arms 120A and 120B lower the end effectors 110A and 110B and move the grasping structures 116A and 116B close to the arrangement base 410 while squashing the tip portions of the suction structures 111A and 111B. Moreover, the control device 600 makes the grasping structures 116A and 116B cancel the grasping and place the magnets 420 on the workpiece W. The workpiece W is fixed to the arrangement base 410 by the weights and magnetic forces of the magnets 420 with the workpiece W pressed by the suction structures 111A and 111B and held at a predetermined position. By moving the grasping structures 116A and 116B close to the arrangement base 410, the magnets 420 can be stably placed.

There may exist dimensional tolerance of the workpiece W in the longitudinal direction DW1. However, by arranging the workpiece W in a bent state, the edges W2 and W3 of the workpiece W can be arranged at the predetermined positions of the arrangement base 410 regardless of the dimensional tolerance. With this, the pressure-joining with respect to the edges W2 and W3 of the workpiece W at an accurate position can be performed.

Figure 14:
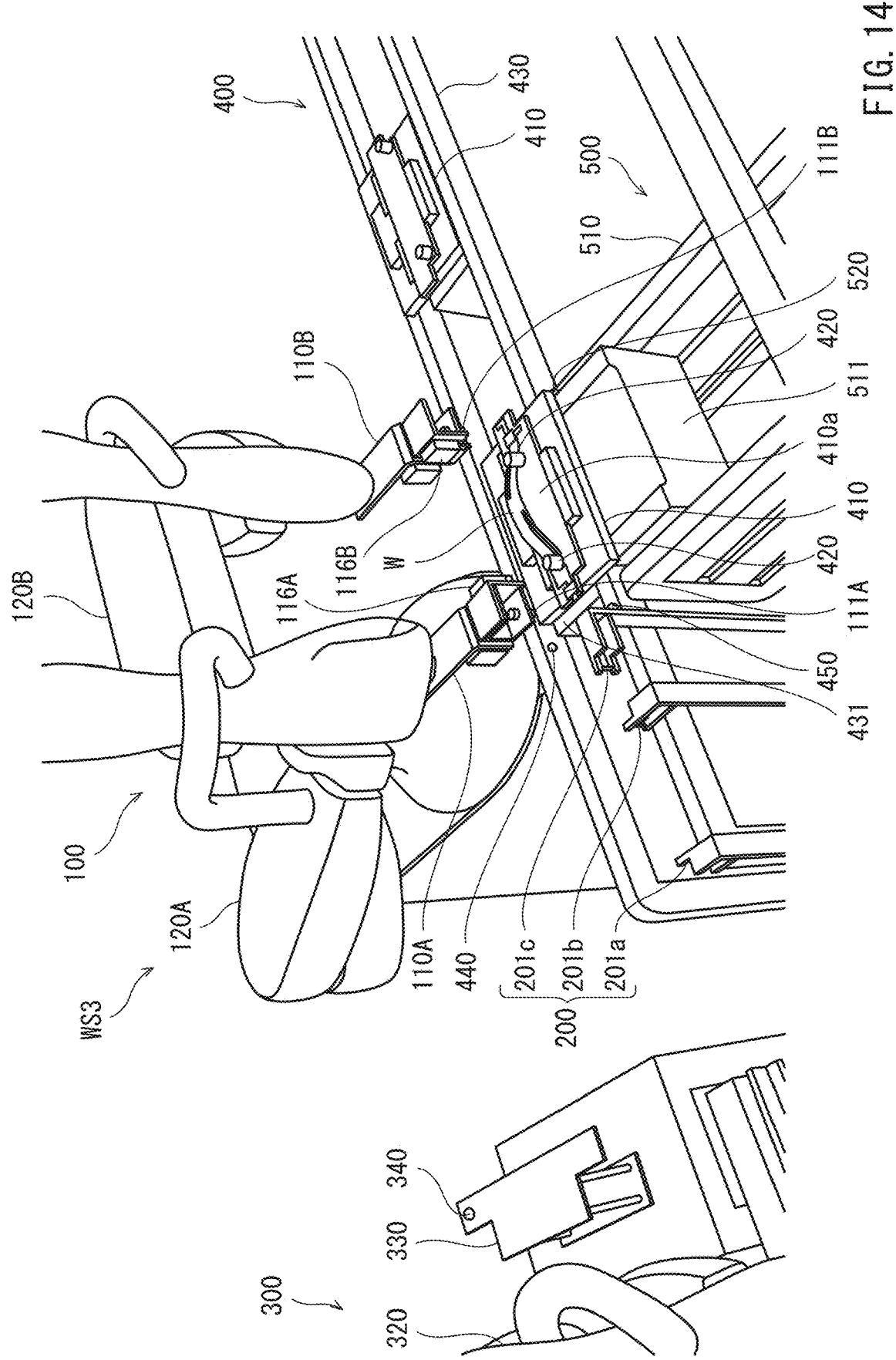
FIG. 14 is a perspective view showing one example of the state of the robot system that is operating in accordance with the flow chart of FIG. 7.

Next, in Step S110, the control device 600 makes the robot arms 120A and 120B lift the end effectors 110A and 110B. Moreover, as shown in FIG. 14, the control device 600 detects the existence of the workpiece W on the arrangement base 410 by the detection signal of the conveyance sensor 450 and makes the transfer base 431 of the transfer device 430 move the arrangement base 410 to the transfer base 511 of the transfer device 510. Furthermore, the control device 600 detects the arrangement base 410 on the transfer base 511 by the detection signal of the conveyance sensor 520 and makes the transfer device 510 convey the arrangement base 410 to the fourth workspace WS4. Moreover, when the control device 600 detects the arrangement base 410 on the transfer base 511, the control device 600 makes the transfer device 430 convey the next arrangement base 410 to a predetermined position in front of the robot 100.

Through Steps S101 to S110 described above, the robot system 1 arranges the workpiece W, conveyed from the first workspace WS1 to the third workspace WS3, at the arrangement base 410 conveyed from the second workspace WS2 to the third workspace WS3, and conveys to the fourth workspace WS4 the arrangement base 410 on which the workpiece W is placed. Moreover, the control device 600 can continuously convey the workpieces W on the plate WP to the fourth workspace WS4 in such a manner that: after the completion of Step S103, Step S101 and the subsequent steps are executed simultaneously with Step S104; and after the completion of Step S110, Step S102 is executed.

Modified Example

The configuration of the end effector according to the modified example will be described. The end effector according to the present modified example includes a structure that lifts or lowers the grasping claws 1161 and 1162. Hereinafter, differences of the present modified example from the embodiment will be mainly described, and the same explanations as the embodiment will be suitably omitted.

Figure 15:
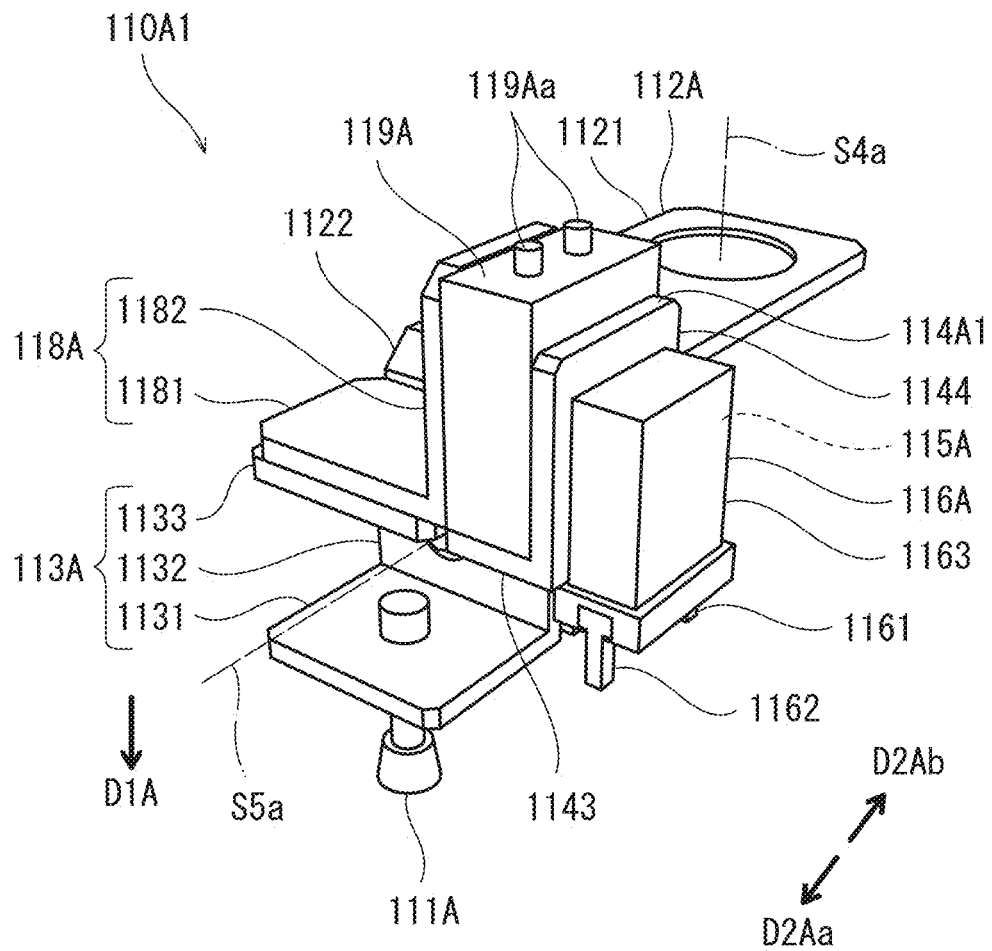
FIG. 15 is a perspective view showing one example of the configuration of the first end effector according to a modified example.
Figure 16:
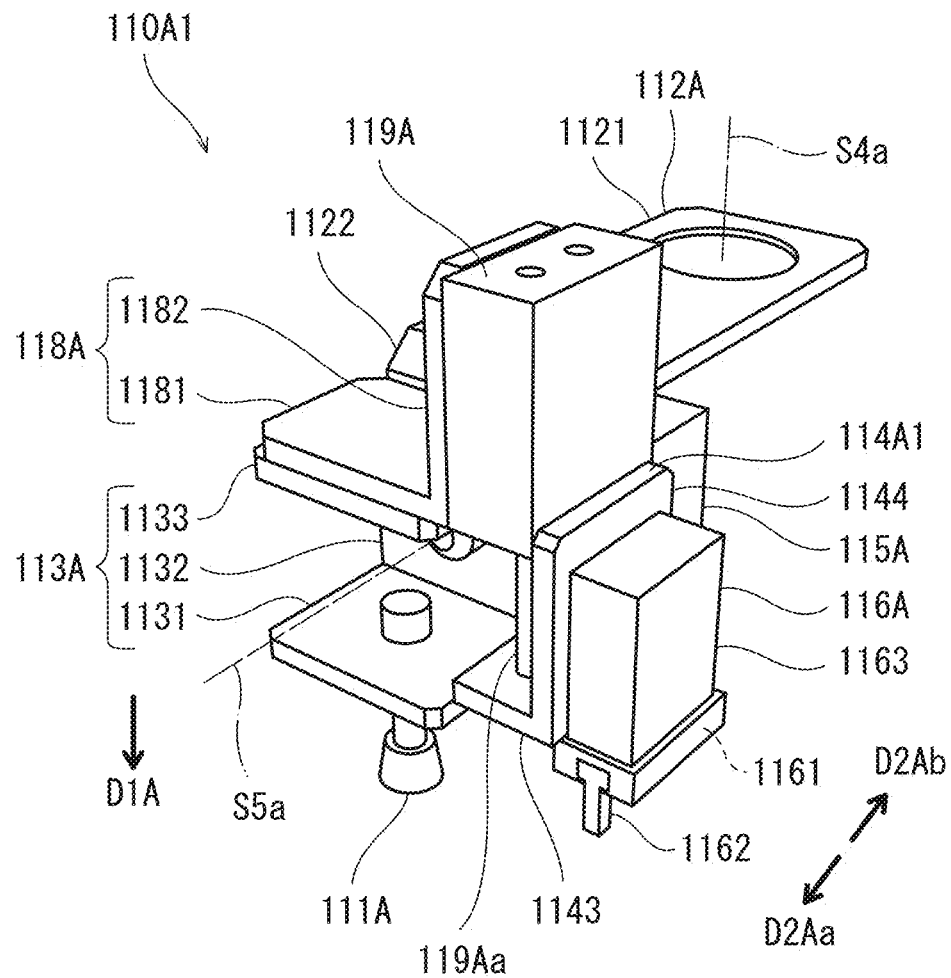
FIG. 16 is a perspective view showing one example of the configuration of the first end effector according to the modified example.

FIGS. 15 and 16 are perspective views each showing one example of the configuration of a first end effector 110A1 according to the modified example. FIG. 15 shows that the grasping claws 1161 and 1162 are lifted, and FIG. 16 shows that the grasping claws 1161 and 1162 are lowered. As with the end effectors 110A and 110B according to the embodiment, the configuration of the first end effector 110A1 according to the present modified example and the configuration of the second end effector according to the present modified example are symmetrical to each other. Therefore, hereinafter, only the first end effector 110A1 will be described, and the explanation of the second end effector will be omitted.

As shown in FIGS. 15 and 16, the first end effector 110A1 includes the suction structure 111A, the base 112A, the turning support 113A, the turning device 115A, the grasping structure 116A, the force sensor 117A (not shown), a lifting support 118A, a grasping support 114A1, and a lifting device 119A. The suction structure 111A, the base 112A, the turning support 113A, the turning device 115A, the grasping structure 116A, and the force sensor 117A are the same in configuration as those of the embodiment.

The lifting support 118A includes a plate-shaped member having an L-shaped section. The lifting support 118A includes plate-shaped portions 1181 and 1182 that are substantially perpendicular to each other. The first plate-shaped portion 1181 is detachably joined to the opposing portion 1133 of the turning support 113A. The second plate-shaped portion 1182 extends in a direction opposite to the first direction D1A so as to separate from the opposing portion 1133 at the lateral side of the intermediate portion 1132. The second plate-shaped portion 1182 is substantially parallel to the fifth axis S5a.

The lifting device 119A is attached to the second plate-shaped portion 1182 of the lifting support 118A at an opposite side of the second plate-shaped portion 1182 from the first plate-shaped portion 1181. The lifting device 119A moves lifting shafts 119Aa thereof in an axial direction, i.e., in the first direction D1A and its opposite direction. The lifting device 119A includes, for example, an electric motor that uses electric power as a power source. In the present embodiment, the lifting device 119A includes a servomotor. Moreover, the lifting device 119A includes a transmitting structure (not shown) that converts rotational driving force of the servomotor into linear driving force and transmits the linear driving force to the lifting shafts 119Aa. The lifting device 119A may include a driving device, such as a linear actuator or a solenoid. The lifting device 119A is one example of a moving device.

The grasping support 114A1 includes a plate-shaped member having an L-shaped section. The grasping support 114A1 includes plate-shaped portions 1143 and 1144 that are substantially perpendicular to each other. The first plate-shaped portion 1143 is attached to end portions of the lifting shafts 119Aa in the first direction D1A. The grasping support 114A1 moves in the first direction D1A and its opposite direction together with the lifting shafts 119Aa. The second plate-shaped portion 1144 extends from the first plate-shaped portion 1143 in the direction opposite to the first direction D1A at an opposite side of the lifting device 119A from the lifting support 118A. The second plate-shaped portion 1144 is opposed to the second plate-shaped portion 1182 of the lifting support 118A through the lifting device 119A.

The grasping structure 116A is attached to the second plate-shaped portion 1144 of the grasping support 114A1 at an opposite side of the second plate-shaped portion 1144 from the lifting device 119A. The grasping claws 1161 and 1162 of the grasping structure 116A extend in the first direction D1A and are lined up in the second directions D2Aa and D2Ba. The grasping structure 116A and the first suction structure 111A are lined up in a horizontal direction substantially perpendicular to the fifth axis S5a and the second directions D2Aa and D2Ab.

In the above first end effector 110A1, the lifting device 119A can move the grasping structure 116A in the first direction D1A and its opposite direction. For example, as shown in FIG. 15, regarding height positions along the first direction D1A, when the lifting device 119A lifts the grasping structure 116A in the direction opposite to the first direction D1A, the height positions of the tips of the grasping claws 1161 and 1162 can be set to height positions at the upper side of the tip of the suction structure 111A in the direction opposite to the first direction D1A. Moreover, as shown in FIG. 16, when the lifting device 119A lowers the grasping structure 116A in the first direction D1A, the height positions of the tips of the grasping claws 1161 and 1162 can be set to height positions at the lower side of the tip of the suction structure 111A in the first direction D1A or height positions that are the same as the height position of the tip of the suction structure 111A.

Therefore, in a state where the workpiece W held by the suction structure 111A is placed on the arrangement base 410, the first end effector 110A1 can operate the lifting device 119A to place, on the workpiece W, the magnets 420 grasped by the grasping claws 1161 and 1162. At this time, unlike the embodiment, it is unnecessary to lower the first end effector 110A1 and squash the tip portion of the suction structure 111A.

Moreover, the end effector according to the present modified example includes a structure that lifts or lowers the grasping claws 1161 and 1162, but is not limited to this and may include a structure that lifts or lowers the suction structures 111A and 111B. In this case, the end effector may include a lifting device similar to the lifting device 119A and may lift or lower the suction structures 111A and 111B by this lifting device. Or, the end effector may include a structure that lifts or lowers the grasping claws 1161 and 1162 and a structure that lifts or lowers the suction structures 111A and 111B.

OTHER EMBODIMENTS

The foregoing has described the examples of the embodiment of the present disclosure. However, the present disclosure is not limited to the above embodiment and the above modified example. To be specific, various modifications and improvements may be made within the scope of the present disclosure. For example, modes prepared by variously modifying the above embodiment and the above modified example and modes prepared by combining the components in the above embodiment and the above modified example are included within the scope of the present disclosure.

For example, in the embodiment and the modified example, the robot 100 is a double-arm robot including the robot arms 120A and 120B. However, the embodiment and the modified example are not limited to this. For example, the robot 100 may include only one arm or may include three or more arms. For example, the robot arms 120A and 120B may be mounted on respective robots.

In the embodiment and the modified example, the first end effector and the second end effector are separately arranged at the first robot arm 120A and the second robot arm 120B. However, the embodiment and the modified example are not limited to this. For example, the first end effector and the second end effector may be integrated with each other. To be specific, one end effector may include first and second suction structures, first and second grasping structures, and first and second turning devices and may further include first and second lifting devices. In this case, the bases 112A and 112B may be coupled to each other by a coupling member or the like or may be integrated with each other. In the former case, the coupling member may be provided with an expansion device that expands or contracts the coupling member so as to change an interval between the bases 112A and 112B. For example, the expansion device may include: an expansion structure including a ball screw structure, a rack-and-pinion structure, or the like; and a driving device, such as an electric motor, which drives the expansion structure.

In the embodiment and the modified example, each of the suction structures 111A and 111B of the end effectors 110A, 110B, and 110A1 suck an object by the generation of negative pressure. However, the embodiment and the modified example are not limited to this. For example, the suction structure may adhere to an object by adhesive force. Or, the suction structure may include a suction cup made of rubber, resin, or the like having flexibility and may suck an object by pressing the suction cup against the object. Furthermore, to increase suction force, a structure that draws out air of a suction surface of the suction cup may be disposed.

In the embodiment and the modified example, each of the number of suction structures 111A and the number of suction structures 111B in each of the end effectors 110A, 110B, and 110A1 is one. However, the embodiment and the modified example are not limited to this, and each of the number of suction structures 111A and the number of suction structures 111B may be two or more.

In the embodiment and the modified example, the robot 100 that is an industrial robot is described as an example of a mechanical device to which the technique of the present disclosure is applicable. However, the mechanical device to which the technique of the present disclosure is applicable may be a mechanical device other than the industrial robot. For example, the mechanical device may be a service robot, a construction machine, a tunnel boring machine, a crane, a loading carrier, a humanoid, or the like. The service robot is a robot used in various service industries, such as care giving, medical care, cleaning, security, guidance, rescue, cooking, and product offerings.

The technique of the present disclosure may be a control method. For example, a control method according to one aspect of the present disclosure is a control method of conveying a main member by using a first robot arm and a second robot arm, the first robot arm including a first suction structure and a first grasping structure which are adjacent to each other in a direction intersecting with a first direction, the second robot arm including a second suction structure and a second grasping structure which are adjacent to each other in a direction intersecting with the first direction. The control method includes: operating the first robot arm and the second robot arm to make the first grasping structure grasp a first auxiliary member located in the first direction and make the second grasping structure grasp a second auxiliary member located in the first direction; with the first grasping structure and the second grasping structure respectively grasping the first auxiliary member and the second auxiliary member, operating the first robot arm and the second robot arm to make the first suction structure and the second suction structure suck and hold the main member located in the first direction; operating the first robot arm and the second robot arm to move the sucked main member and place the main member on an arrangement surface of a conveyance destination; and making the first grasping structure and the second grasping structure cancel the grasping and place the first auxiliary member and the second auxiliary member on the main member. This control method may be realized by a CPU, a circuit (such as an LSI), an IC card, a single module, or the like.

The technique of the present disclosure may be a program for executing the above control method or may be a non-transitory, computer-readable recording medium that stores the above program therein. Furthermore, needless to say, the above program is distributable via a transmission medium, such as the Internet.

All the numerals, such as the ordinal numbers and the numbers, are examples used to specifically describe the technique of the present disclosure, and the present disclosure is not limited to these numerals. Furthermore, connection relations among the components are examples used to specifically describe the technique of the present disclosure, and the connection relations that realize the functions of the present disclosure are not limited to these.

The division of the blocks in the functional block diagram is one example. Plural blocks may be realized as one block, one block may be divided into plural blocks, and/or some of the functions may be transferred to other blocks. The functions of plural blocks having similar functions may be processed by single hardware or software in parallel or in a time division manner.

The invention claimed is:

1. A control method of conveying a main member by using a first robot arm and a second robot arm, the first robot arm including a first suction structure and a first grasping structure which are adjacent to each other in a direction intersecting with a first operational direction, the second robot arm including a second suction structure and a second grasping structure which are adjacent to each other in a direction intersecting with the first operational direction, the control method comprising:
operating the first robot arm and the second robot arm to make the first grasping structure grasp a first auxiliary member located in the first operational direction and make the second grasping structure grasp a second auxiliary member located in the first operational direction;
with the first grasping structure and the second grasping structure respectively grasping the first auxiliary member and the second auxiliary member, operating the first robot arm and the second robot arm to make the first suction structure and the second suction structure suck and hold the main member located in the first operational direction;
operating the first robot arm and the second robot arm to move the sucked main member and place the main member on an arrangement surface of a conveyance destination; and
making the first grasping structure and the second grasping structure cancel the grasping and place the first auxiliary member and the second auxiliary member on the main member.

2. The control method according to claim 1, further comprising:
operating the first robot arm and the second robot arm to make a position detector, which detects a position of the main member, detect the sucked main member; and
based on a detection result of the position detector, operating the first robot arm and the second robot arm to adjust an interval between the first suction structure and the second suction structure on the arrangement surface.

3. The control method according to claim 1, wherein:
the first suction structure and the first grasping structure are attached to the first robot arm through a first support and a first base;
the first support supports the first suction structure and the first grasping structure;
the first base is attached to the first robot arm and is coupled to the first support such that the first support is turnable;
the first support is turned by a first turner;
the second suction structure and the second grasping structure are attached to the second robot arm through a second support and a second base;
the second support supports the second suction structure and the second grasping structure;
the second base is attached to the second robot arm and is coupled to the second support such that the second support is turnable; and
the second support is turned by a second turner.

4. The control method according to claim 1, further comprising making a first mover, which moves the first grasping structure in the first operational direction, and a second mover, which moves the second grasping structure in the first operational direction, move the first grasping structure and the second grasping structure in the first operational direction to place on the main member the first auxiliary member grasped by the first grasping structure and the second auxiliary member grasped by the second grasping structure.

5. The control method according to claim 1, further comprising operating the first robot arm and the second robot arm such that the first suction structure including a portion that is extensible and contractable and the second suction structure including a portion that is extensible and contractable are pressed against the main member to be contracted, and with this, the first auxiliary member grasped by the first grasping structure and the second auxiliary member grasped by the second grasping structure are placed on the main member.

6. A control device that executes the control method according to claim 1.

7. A robot system comprising:
a first robot arm;
a second robot arm;
a first suction structure and a first grasping structure that are arranged adjacent to each other in a direction intersecting with a first operational direction at the first robot arm;
a second suction structure and a second grasping structure that are arranged adjacent to each other in a direction intersecting with the first operational direction at the second robot arm; and
control circuitry that controls operations of the first robot arm, the second robot arm, the first grasping structure, and the second grasping structure, wherein:
the first suction structure, the first grasping structure, the second suction structure, and the second grasping structure are oriented so as to suck or grasp a main member and auxiliary members located in the first operational direction;
the control circuitry operates the first robot arm and the second robot arm to make the first grasping structure grasp a first auxiliary member located in the first operational direction and make the second grasping structure grasp a second auxiliary member located in the first operational direction;
with the first auxiliary member and the second auxiliary member grasped, the control circuitry operates the first robot arm and the second robot arm to make the first suction structure and the second suction structure suck and hold the main member located in the first operational direction;
the control circuitry operates the first robot arm and the second robot arm to move the sucked main member and place the main member on an arrangement surface of a conveyance destination; and
the control circuitry makes the first grasping structure and the second grasping structure cancel the grasping and place the first auxiliary member and the second auxiliary member on the main member.

8. A robot system comprising:
a robot arm;
a first suction structure and a first grasping structure that are arranged adjacent to each other in a direction intersecting with a first operational direction at the robot arm;
a second suction structure and a second grasping structure that are arranged adjacent to each other in a direction intersecting with the first operational direction at the robot arm; and
control circuitry that controls operations of the robot arm, the first grasping structure, and the second grasping structure, wherein:
the first suction structure, the first grasping structure, the second suction structure, and the second grasping structure are oriented so as to suck or grasp a main member and auxiliary members located in the first operational direction;
the control circuitry operates the robot arm to make the first grasping structure grasp a first auxiliary member located in the first operational direction and make the second grasping structure grasp a second auxiliary member located in the first operational direction;
with the first auxiliary member and the second auxiliary member grasped, the control circuitry operates the robot arm to make the first suction structure and the second suction structure suck and hold the main member located in the first operational direction;
the control circuitry operates the robot arm to move the sucked main member and place the main member on an arrangement surface of a conveyance destination; and
the control circuitry makes the first grasping structure and the second grasping structure cancel the grasping and place the first auxiliary member and the second auxiliary member on the main member.

9. The robot system according to claim 7, further comprising a position detector that detects a position of the main member and outputs a detection result to the control circuitry, wherein:
based on the detection result of the position detector, the control circuitry detects a relative position of the main member relative to the first suction structure and the second suction structure; and
based on the relative position, the control circuitry operates the robot arm to adjust positions of the first suction structure and the second suction structure on the arrangement surface.

10. The robot system according to claim 7, wherein:
the first suction structure and the first grasping structure are attached to the robot arm through a first support and a first base;
the first support supports the first suction structure and the first grasping structure;
the first base is attached to the robot arm and is coupled to the first support such that the first support is turnable;
the first support is turned by a first turner;
the second suction structure and the second grasping structure are attached to the robot arm through a second support and a second base;
the second support supports the second suction structure and the second grasping structure;
the second base is attached to the robot arm and is coupled to the second support such that the second support is turnable; and
the second support is turned by a second turner.

11. The robot system according to claim 7, further comprising:
a first moving device that is located at the robot arm and moves the first grasping structure in the first operational direction; and
a second moving device that is located at the robot arm and moves the second grasping structure in the first operational direction,
wherein the control circuitry makes the first moving device and the second moving device move the first grasping structure and the second grasping structure in the first operational direction to place on the main member the first auxiliary member grasped by the first grasping structure and the second auxiliary member grasped by the second grasping structure.

12. The robot system according to claim 7, wherein:
at least one of the first suction structure and the second suction structure includes a portion that is extensible and contractable; and
the control circuitry operates the robot arm such that the at least one of the first suction structure and the second suction structure is pressed against the main member to be contracted, and with this, the first auxiliary member grasped by the first grasping structure and the second auxiliary member grasped by the second grasping structure are placed on the main member.

13. The robot system according to claim 7, wherein:
the main member is a plate-shaped member, and
the auxiliary members are weights that press the main member.

14. The robot system according to claim 13, wherein:
the auxiliary members are magnets.

15. The robot system according to claim 14, further comprising:
an arrangement base including the arrangement surface and including a material having magnetism.

16. The control method according to claim 1, wherein:
the main member is a plate-shaped member, and
the auxiliary members are weights that press the main member.

17. The control method according to claim 16, wherein:
the auxiliary members are magnets and are placed on the main member to fix the main member to the arrangement surface by magnetic force.

18. The robot system according to claim 8, wherein:
the first suction structure and the second suction structure are on a single end-effector attached to the robot arm.

19. The robot system according to claim 8, further comprising:
a position detector that detects a position of the main member,
wherein the control circuitry adjusts a position of the main member on the arrangement surface based on a detection result from the position detector.

20. The robot system according to claim 8, further comprising:
a mover to move the first grasping structure in the first operational direction.

* * * * *